(12) United States Patent
Agarwal

(10) Patent No.: US 10,846,017 B2
(45) Date of Patent: Nov. 24, 2020

(54) SECURE DIGITAL (SD) TO NVME BUFFER MANAGER

(71) Applicant: Western Digital Technologies, Inc., San Jose, CA (US)

(72) Inventor: Dinesh Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 88 days.

(21) Appl. No.: 15/841,807

(22) Filed: Dec. 14, 2017

(65) Prior Publication Data

US 2019/0187928 A1 Jun. 20, 2019

(51) Int. Cl.
*G06F 3/06* (2006.01)
*G06F 12/02* (2006.01)
*G06F 13/16* (2006.01)

(52) U.S. Cl.
CPC .......... *G06F 3/0659* (2013.01); *G06F 3/0611* (2013.01); *G06F 3/0679* (2013.01); *G06F 12/0246* (2013.01); *G06F 13/1673* (2013.01); *G06F 2212/7203* (2013.01); *G06F 2212/7205* (2013.01); *G06F 2212/7211* (2013.01)

(58) Field of Classification Search
CPC ............... G06F 3/0659; G06F 12/0246; G06F 13/1673; G06F 2212/7203; G06F 2212/7205; G06F 2212/7211
See application file for complete search history.

(56) References Cited

U.S. PATENT DOCUMENTS

| | | | |
|---|---|---|---|
| 7,069,369 B2 | 6/2006 | Chou et al. | |
| 7,194,562 B2 | 3/2007 | Barnes et al. | |
| 8,271,692 B1 | 9/2012 | Dinh et al. | |
| 9,430,412 B2 | 8/2016 | Huang | |
| 2005/0114562 A1* | 5/2005 | Barnes | G06F 11/1076 710/29 |
| 2013/0086311 A1 | 4/2013 | Huang et al. | |

(Continued)

OTHER PUBLICATIONS

Pinto, Yosi,"SD + PCIe/NVMe card New Innovations in SF Cards Lead the Way to Mobile Everything," SD Association, Flash Memory Summit, Aug. 9, 2017, 21 pages.

(Continued)

*Primary Examiner* — William B Partridge
*Assistant Examiner* — Eric T Loonan
(74) *Attorney, Agent, or Firm* — Vierra Magen Marcus LLP

(57) ABSTRACT

A non-volatile memory system accepts Secure Digital (SD) Commands and manages a data buffer that buffers data for the SD commands. The SD Commands may be accepted over an SD bus of the non-volatile memory system. The SD Commands may be accepted over a PCIe bus of the non-volatile memory system. The memory system may generate one or more NVMe commands for each SD command, and submit the NVMe command(s) to an NVMe submission queue. Upon completion all of the NVMe commands that were generated for an SD command, the memory system may report completion status of the SD command to an SD host. The memory system ensures that the timing requirements for SD commands are met even though a conversion from SD commands to NVMe commands may be performed. The memory system makes efficient use of the depth of the NVMe submission queue.

20 Claims, 15 Drawing Sheets

(56) References Cited

U.S. PATENT DOCUMENTS

| | | | |
|---|---|---|---|
| 2015/0134857 A1* | 5/2015 | Hahn | G06F 3/061 710/5 |
| 2016/0179404 A1* | 6/2016 | Nanduri | G06F 3/061 711/103 |
| 2016/0328347 A1 | 11/2016 | Worley et al. | |

OTHER PUBLICATIONS

NVM Express, Revision 1.3a, Oct. 24, 2017, 287 pages.
SD Group, "SD Specifications, Part 1—Physical Layer Specification," Version 6.00, Feb. 27, 2017, 317 pages.

* cited by examiner

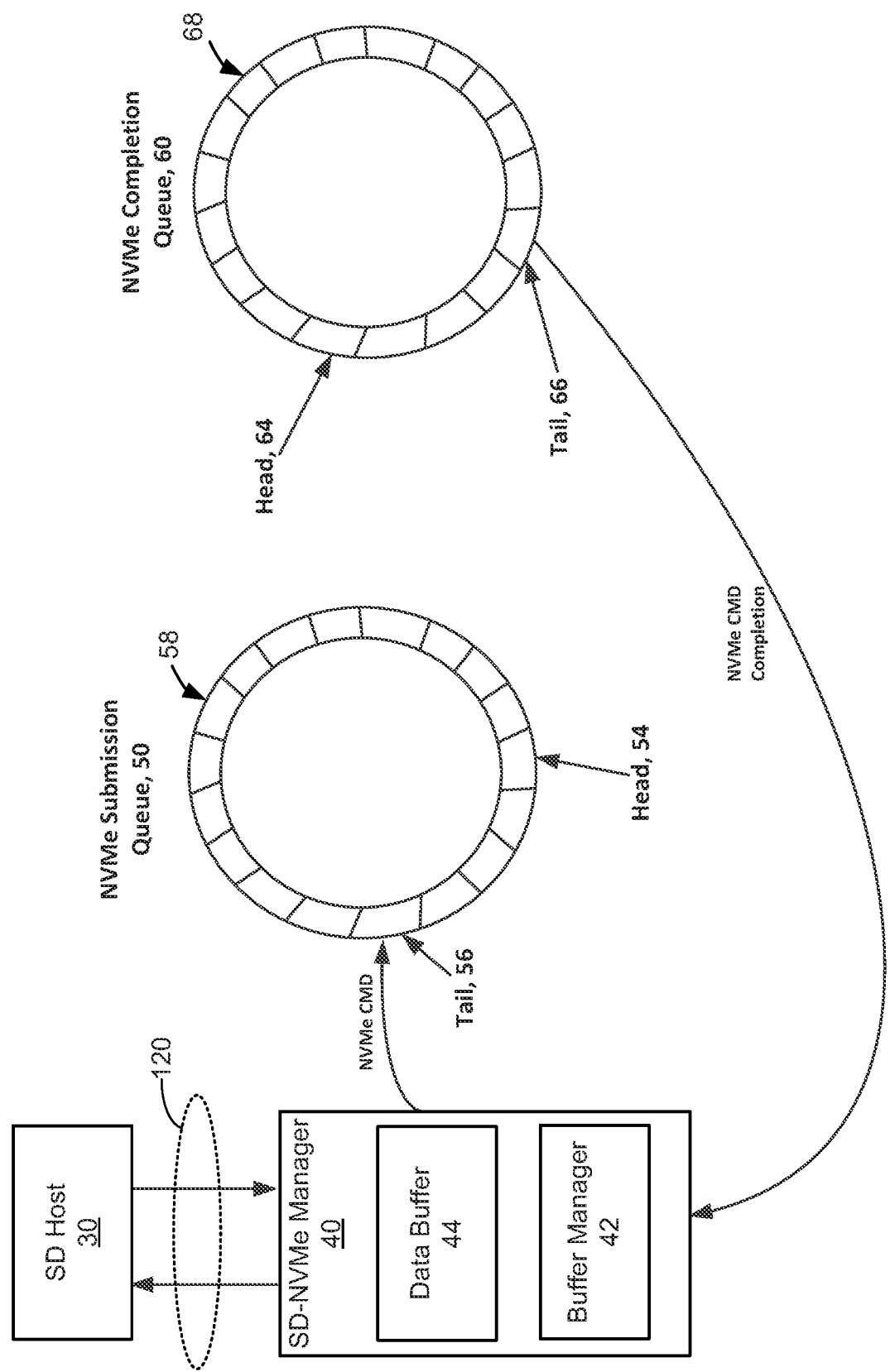

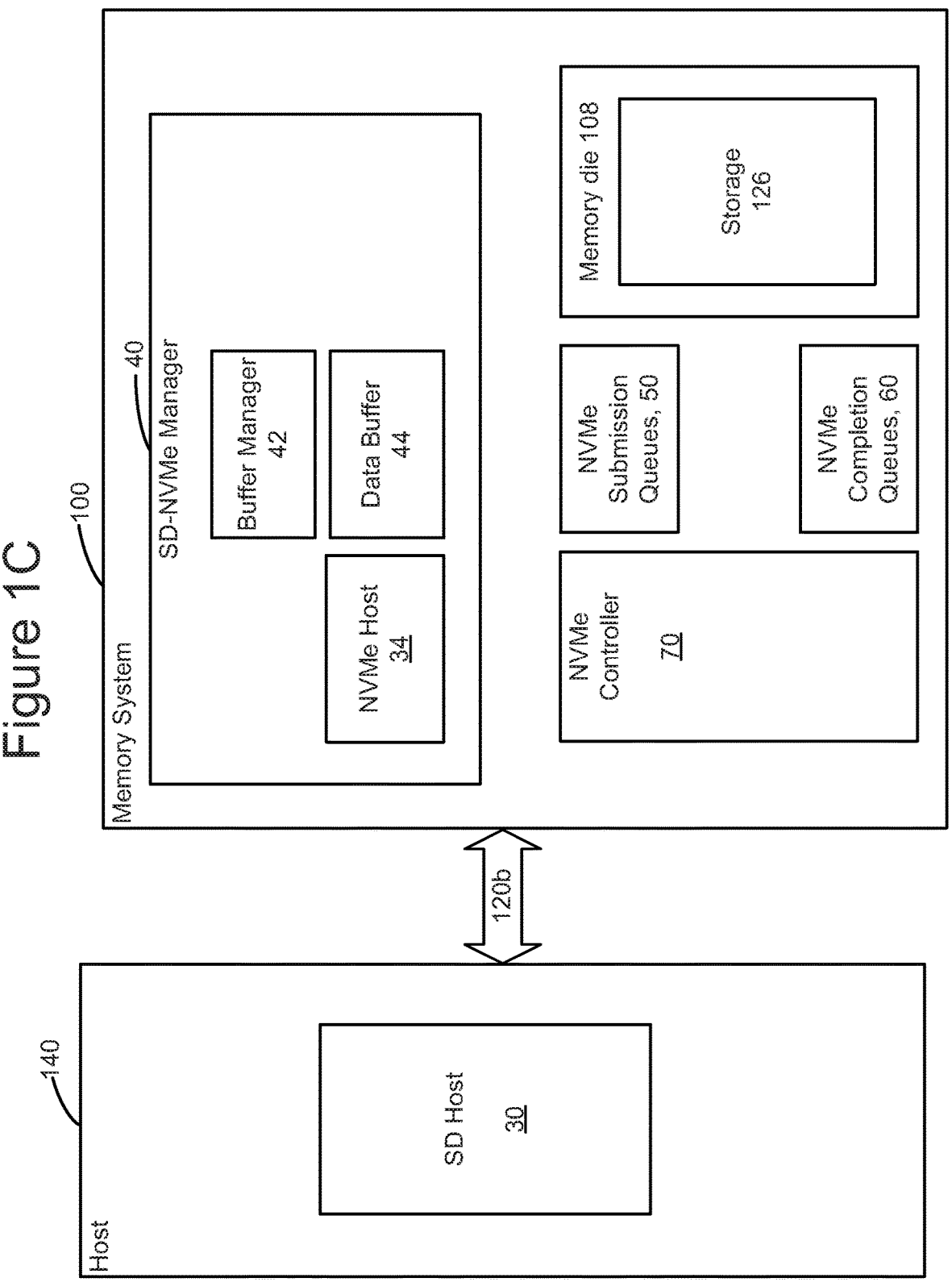

US 10,846,017 B2

SECURE DIGITAL (SD) TO NVME BUFFER MANAGER

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other memory systems. Typically, the memory system has a controller which controls data transfers between the memory system and a host over a physical interface. The controller and host communicate over the physical interface in accordance with a communication protocol. The controller may also control access to non-volatile memory cells in which the host data is stored.

The physical interface may be, for example, a Peripheral Computer Interface Express (PCIe) bus. Non-volatile Memory Express (NVMe) is a collection of standards for accessing non-volatile memory. NVM Express (NVMe) or Non-Volatile Memory Host Controller Interface Specification (NVMHCIS) is an open logical device interface specification for accessing non-volatile storage media attached via a PCI Express (PCIe) bus. NVMe has NVMe submission queues, on which commands to access the memory cells may be queued. The NVMe submission queue is a circular buffer that an NVMe host may use to submit commands for execution by the memory controller. NVMe also has NVMe completion queues. An NVMe completion queue is a circular buffer to post status for completed commands.

The physical interface may be, for example, a Secure Digital (SD) interface. Secure Digital is an interface specification for accessing non-volatile storage attached via an SD bus. The SD Association provides SD specifications. Secure Digital supports a multiple block read operation, as well as a multiple block write operation. A block refers to a unit of data transfer, and may alternatively be referred to herein as a sector. In multiple block operations, an SD host may send either a multiple block read or write command to the memory system over a command line. The memory system sends a response over the command line to the SD host acknowledging the command. For a multiple block write operation, the SD host sends a data block over data lines to the memory system. The memory system may assert a busy signal until the memory system is ready to receive another data block. Then, the SD host may then send another data block, and again the memory system may assert busy until it is ready to receive another data block. The memory system is allowed a certain amount of time to program the data block. For example, the memory system may have 250 milliseconds (ms) to program the data block. Note that this time limit is enforced per data block, and not per the entire write command. For a multiple block read operation, the memory system sends multiple data blocks over the data lines to the SD host. The memory system is allowed a certain amount of time between the sending of each of the data blocks. For example, the memory system may have 100 milliseconds (ms) between the sending of each of the data blocks. Note that this time limit is enforced per data block, and not per the entire read command.

BRIEF DESCRIPTION OF THE DRAWINGS

FIG. 1A is a diagram that illustrates on overview of one embodiment of using SD commands with NVMe queues.

FIG. 1C is a block diagram depicting another embodiment of a storage system connected to a host device that can implement embodiments of the present technology.

DETAILED DESCRIPTION

Figure 1B:
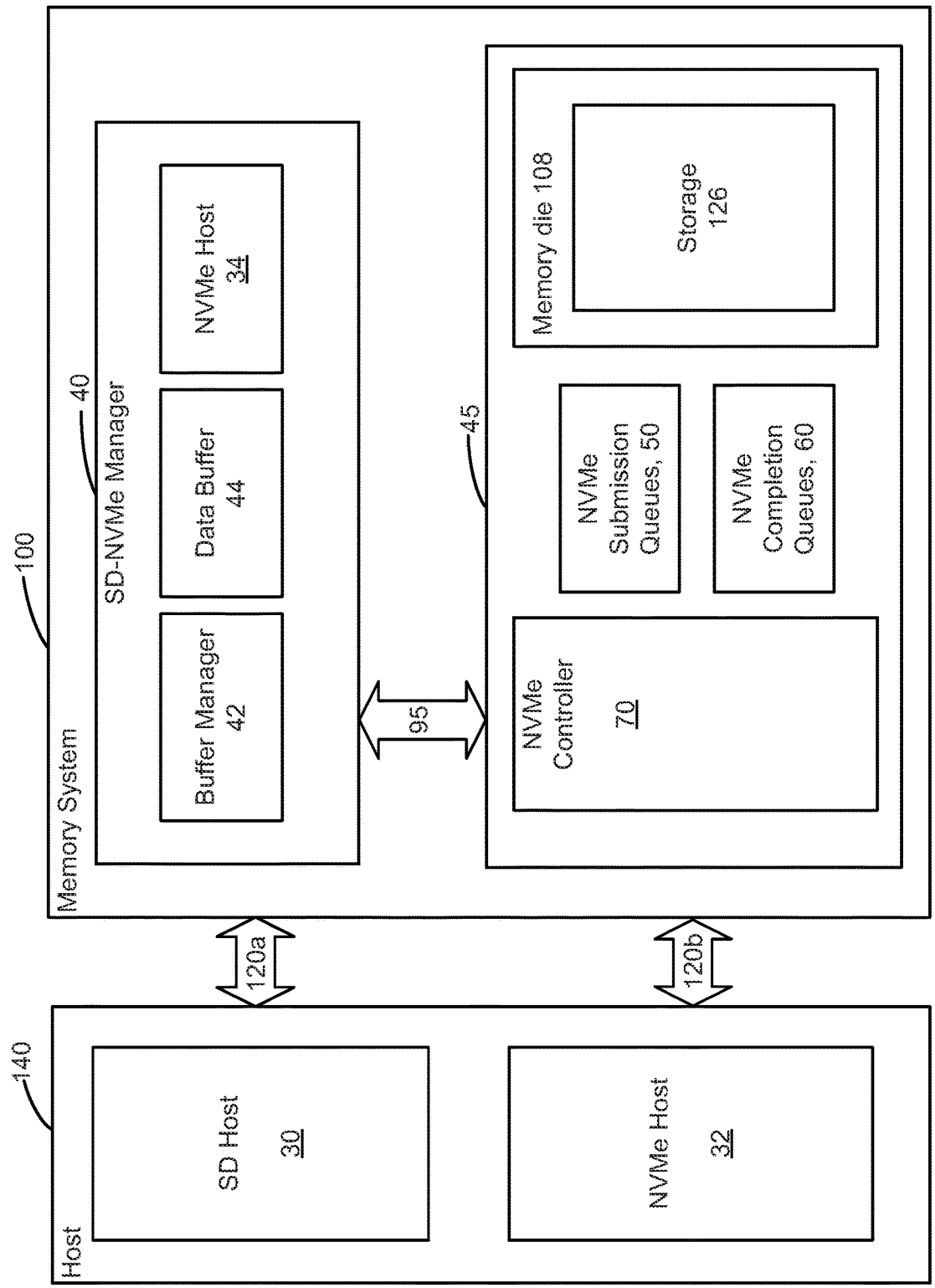
FIG. 1B is a block diagram depicting one embodiment of a storage system connected to a host device that can implement embodiments of the present technology.

Technology is described herein for operating non-volatile storage. One embodiment is a non-volatile memory system that accepts SD Commands and manages a data buffer that buffers data for the SD commands. The SD Commands are accepted over an SD bus of the non-volatile memory system, in one embodiment. The SD Commands are accepted over a PCIe bus of the non-volatile memory system, in one embodiment. The memory system may generate one or more NVMe commands for each SD command, and submit the NVMe command(s) to an NVMe submission queue. Upon completion all of the NVMe commands that were generated for an SD command, the memory system may report completion status of the SD command to an SD host.

Timing requirements may be different for SD Commands than for NVMe commands. Timing for SD commands may be on a sector basis. For example, the timing requirements for SD commands may be enforced on a per block basis (a block in this context may also be referred to as a "sector"). However, the timing requirements for an NVMe command may be enforced on a per command basis. Note that the memory system may form one NVMe command for many SD sectors of an SD command. Embodiments of a memory system ensure that the timing requirements for SD commands are met even though a conversion from SD commands to NVMe commands may be performed.

The SD commands might or might not be queued in the memory system. In one embodiment, the SD host sends the SD commands to the memory system in a non-queued mode. Embodiments of the memory system form one or more NVMe commands based on data from a single SD command, and place the one or more NVMe commands onto an NVMe submission queue. Thus, the memory system makes efficient use of the depth of the NVMe submission queue, in one embodiment.

FIG. 1A is a diagram that illustrates on overview of one embodiment of using SD commands with NVMe queues. FIG. 1A shows an SD host 30, SD-NVMe manager 40, an NVMe submission queue 50, and an NVMe completion queue 52. The SD-NVMe manager 40, NVMe submission queue 50, and NVMe completion queue 52 are implemented in one embodiment of a memory system.

The NVMe submission queue 50 is a circular buffer having a head 54 and a tail 56. Each of the slots 58 in the NVMe submission queue 50 may be of some fixed size. The NVMe completion queue 60 is a circular buffer having a head 64 and a tail 66. Each of the slots 58, 68 is processor readable storage. Each of the slots 68 in the NVMe completion queue 60 may be of some fixed size.

Note that the NVMe submission queue 50 and the NVMe completion queue 60, as the terms are used herein, are tangible implementations of data structures. The NVMe submission queue 50 is implemented in non-transitory storage, which is used to store NVMe commands and the like. The NVMe submission queue 50 could be implemented in non-volatile memory, in volatile memory, or as a set of registers. The NVMe completion queue 60 is implemented in non-transitory storage, which is used to store results for NVMe commands and the like. The NVMe completion queue 60 could be implemented in non-volatile memory, in volatile memory, or as a set of registers.

The SD host 30 sends SD commands to the SD-NVMe manager 40 over the communication interface 120. The communication interface 120 includes both a physical interface and circuitry to implement a communication protocol. The physical interface is a Peripheral Computer Interface Express (PCIe) bus, in one embodiment. The physical interface is a Secure Digital (SD) bus, in one embodiment. The communication protocol is Non-volatile Memory Express (NVMe), in one embodiment. The communication protocol is Secure Digital (SD), in one embodiment. In one embodiment, communication interface 120 is NVMe over PCIe. In one embodiment, communication interface 120 uses a Secure Digital (SD) protocol over an SD bus. In one embodiment, SD commands are sent over a PCIe bus.

The SD commands include commands to access non-volatile storage (which is not depicted in FIG. 1A). The SD commands could include, but are not limited to, multiple block read operations and multiple block write operations. As noted above, there could be many data blocks (or sectors) sent by the SD host 30 for a single multiple block write operation. Likewise, there may be many data blocks sent to the SD host 30 for a single multiple block read operation.

The SD-NVMe manager 40 has a buffer manager 42, and a data buffer 44. The data buffer 44 is implemented in non-transitory storage. The data buffer 44 could be implemented in volatile memory, non-volatile memory, registers, etc. The data buffer 44 may be used to buffer data from SD host 30 that is to be written to memory storage. The data buffer 44 may be used to buffer data read from memory storage that is to be provided to SD host 30.

The SD-NVMe manager 40 forms one or more NVMe commands for each SD command. The SD-NVMe manager 40 allocates a region in the data buffer 44 for the portion of the SD data associated with one of the NVMe commands, in one embodiment. The size of the region is selected for efficient memory array operations, in one embodiment. For example, the sectors transferred by the SD host 30 for a write operation might each be 512 Bytes. However, memory operations may be more efficient if 32 kilobytes (kB) are programmed in one memory operation. The SD-NVMe manager 40 may thus allocate, for example, 32 kB in the data buffer 44, and transfer a "chunk" of sectors to the data buffer 44 until the 32 kB region is filled. As will be discussed below, the SD-NVMe manager 40 may determine how much space should be allocated for an NVMe command.

The SD-NVMe manager 40 submits each of the NVMe commands to the NVMe submission queue 50. The NVMe command may be added to the tail 56 of the NVMe submission queue 50. The SD-NVMe manager 40 could submit an NVMe command in response to the region allocated in the data buffer 44 for that NVMe command being filled, if this is a write command. In some cases, there may not be enough data sectors to fill the entire allocated region in the data buffer 44. In this case, the SD-NVMe manager 40 may submit an NVMe command to the NVMe submission queue 50 even though the allocated regiond in the data buffer 44 is not full. This may occur if the SD command is "open-ended command". In an open-ended command, the SD host 30 could send a "stop-transmission" at any time. The stop-transmission will be discussed in more detail below.

Upon completion of an NVMe command, a memory controller may post status to the NVMe completion queue 60. The SD-NVMe manager 40 obtains the NVMe command status from the NVMe completion queue 60. When all of the one or more NVMe commands for the SD command are complete, the SD-NVMe manager 40 reports the completion status for the SD command to the SD host 30.

The SD-NVMe manager 40 makes efficient use of the queue depth of the NVMe submission queue 50, in one embodiment. Note that the SD commands are not necessarily queued. However, the SD-NVMe manager 40 queues multiple NVMe commands based on a single SD command, in one embodiment.

The SD-NVMe manager 40 ensures that timing of the SD commands is enforced, in one embodiment. In one embodiment, the SD-NVMe manager 40 throttles the SD host 30 to help enforce SD command timings. The SD-NVMe manager 40 changes the size of the region allocated in the data buffer 44 to an NVMe command in response to the total amount of space available in the data buffer, in one embodiment. For example, the SD-NVMe manager 40 may reduce the size of the region allocated in the data buffer 44 for an NVMe command to help ensure SD timing constraints are met.

FIG. 1B is a block diagram depicting one embodiment of a storage system 100 (also referred to as a "memory system") connected to a host device 140 (or embedded in the host device 140) that can implement embodiments of the present technology. FIG. 1B depicts an embodiment of one configuration of the system of FIG. 1A. Referring to FIG. 1B, the host device 140 stores data into, and retrieves data from, the memory system 100 by issuing write and read commands. The memory system 100 may be embedded in the host device 140 or may exist in the form of a card, or other removable drive, such as a solid state disk (SSD) that is removably connected to the host device 140 through a mechanical and electrical connector. The host device 140 may be any of a number of fixed or portable electronic devices, such as a personal computer, laptop computer, notepad computer, a smartphone, a digital still camera, a digital video camera, a personal digital assistant (PDA), a server, a set top box, or the like. More generally, the host device 140 can include host logic that performs the functions of a personal computer, laptop computer, notepad computer, a smartphone, a digital still camera, a digital video camera, PDA, server, set top box, etc.

The host device 140, which can be referred to more succinctly as the host 140, includes an SD host 30 and an NVMe host 32, in this embodiment. In another embodiment, the host device 140 has the SD host 30, but does not have the NVMe host 32. The SD host 30 is sometimes referred to as an "SD Host Controller." An SD Host Controller may manage SD cards. In one embodiment, the memory system 100 acts as an SD card when communicating with SD host 30.

There are two communication interfaces between the host 140 and memory system 100 in this embodiment. SD interface 120a may be used to transfer SD commands and data between the host 140 and memory system. The SD interface is one embodiment of interface 120 of the system of FIG. 1A. The SD host 30 uses the SD interface 80, in one embodiment. PCIe interface 120b may be used to transfer, for example, NVMe commands and data between the host 140 and memory system 100. The NVMe host uses PCIe interface 120b, in one embodiment. In one embodiment, the NVMe host 32 is an NVM Express host, and the PCIe interface 120b includes a PCIe bus.

The SD host 30 is configured to send SD write commands to the memory system 100 to store data from the host 140 into the memory structure 126, as well as to send SD read commands to the memory system 100 to access data from memory structure 126.

The memory system has one or more memory dies 108 that each have a memory structure 126. Memory structure contains non-volatile memory cells, in one embodiment. The memory structure 126 is used to store host data. The memory structure 126 can be two-dimensional (2D) or three-dimensional (3D). The memory structure 126 may comprise one or more arrays of memory elements (also referred to as memory cells). In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory system 100 is divided into two semiconductor packages in this embodiment. A semiconductor package casing contains one or more semiconductor electronic components. The semiconductor package provides protection against impact and corrosion, and has contact pins or leads which are used to connect to other semiconductor packages, external circuits, etc. One semiconductor package contains the SD-NVMe manager 40, the other semiconductor package 45 contains the memory dies 108 and a memory controller 70. The NVMe submission queue 50 and the NVMe completion queue 60 are depicted on package 45, but could instead be implemented on the SD-NVMe manager 40. There is a PCIe interface 95 between the two semiconductor packages 40, 45, in this embodiment. The PCIe interface 95 includes a PCIe bus. Note that the SD-NVMe manager 40 has a PHY for the PCIe interface 95, in one embodiment. Also, semiconductor package 45 has a PHY for the PCIe interface 95, in one embodiment. The SD-NVMe manager 40 also has a PHY for an SD interface 80, in one embodiment. Thus, the SD-NVMe manager 40 may communicate with the SD host 30 over SD interface 80.

The SD-NVMe manager 40 has a buffer manager 42, data buffer 44, and NVMe host 34. The data buffer 44 may be used to buffer data from host 140 that is to be written to memory structure 126. The data buffer 44 may be used to buffer data from memory structure 126 that is to be provided to host 140. The SD-NVMe manager 40 is configured to receive an SD command and form one or more NVMe commands. The SD-NVMe manager 40 allocates a region in the data buffer 44 for each of the NVMe commands, in one embodiment.

The NVMe submission queue 50 and the NVMe completion queue 60 are implemented in non-transitory storage. The NVMe submission queue 50 could be implemented in non-volatile memory, in volatile memory, or as a set of registers. The NVMe completion queue 60 could be implemented in non-volatile memory, in volatile memory, or as a set of registers. The NVMe host 34 creates the NVMe submission queue 50 and the NVMe completion queue 60 in non-transitory storage, in one embodiment.

The NVMe host 34 submits the NVMe commands to the NVMe submission queues 50. An NVMe command specifies a location in the data buffer 44 for data for the NVMe command, in one embodiment. Thus, NVMe command could specify the physical location in memory (e.g., data buffer 44) by use of, for example, Physical Region Page (PRP) entries or Scatter Gather Lists. Physical Region Page (PRP) entries and Scatter Gather Lists are known in connection with NVMe. In one embodiment, the NVMe host 34 informs the NVMe controller 70 when a new command has been placed on an NVMe submission queue 50. One such mechanism is referred to as a "doorbell." The term "doorbell" is well understood in the context of NVMe. The NVMe host 32 may access entries on the NVMe completion queues 60 in order to provide a completion status of an SD command to the SD host 30.

The NVMe controller 70 accesses the NVMe commands from the NVMe submission queues 50, and forms memory access commands to access the storage 126 in the memory die(s) 108. The NVMe controller 70 may also access data buffer 44. For example, the NVMe controller 70 may access data from the data buffer 44 to form a command to write data to storage 126. The NVMe controller 70 may place data into data buffer 44 that was read from storage 126.

Circuitry within the memory die 108 performs a read or write command in response to a memory access command. The NVMe controller 70 adds completion status to the NVMe completion queues 60 in response to the memory die 108 completing a memory access command. Adding completion status to an NVMe completion queue 60 refers to storing information into one of the slots 68 of the NVMe completion queue 60. In some cases, there is one completion queue for each submission queue. However, multiple submission queues may be associated with a single completion queue.

The SD Host 30, NVMe Host 32, NVMe host 34, NVMe controller 70, and/or buffer manager 42 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system. For example, the SD Host 30, NVMe Host 32, NVMe host 34, NVMe controller 70, and/or buffer manager 42 may include software stored in a processor readable device (e.g., memory) to program a processor to perform the functions described herein. Alternatively, the SD Host 30, NVMe Host 32, NVMe host 34, NVMe controller 70, and/or buffer manager 42 may include an application specific integrated circuit (ASIC), a Field Programmable Gate Array (FPGA), a circuit, a digital logic circuit, an analog circuit, a combination of discrete circuits, gates, or any other type of hardware or combination thereof.

FIG. 1C is a block diagram depicting another embodiment of a storage system 100 (also referred to as a "memory system") connected to a host device 140 (or embedded in the host device 140) that can implement embodiments of the present technology. FIG. 1C depicts an embodiment of one configuration of the system of FIG. 1A. A difference between the configuration of FIGS. 1B and 1C, is that the SD-NVMe manager 40 is in the same semiconductor package as the memory die 108 and controller 70. Thus, a PCIe bus or the like is not needed between the SD-NVMe manager 40 and controller 70.

Referring to FIG. 1C, information is exchanged between the host 140 and memory system over a PCIe interface 120b. The SD host 30 may send SD commands over the PCIe interface 120b to the memory system 100. Data for the SD commands may be transferred between the host 140 and memory system 100. The memory system 100 may have a PHY for a PCIe interface 120b. The PHY for the PCIe interface 120b could be a part of the SD-NVMe manager 40, but the PHY for the PCIe interface 120b could be located elsewhere in the memory system 100.

Another difference between the configuration in FIG. 1C and FIG. 1B is that the configuration of FIG. 1C does not have an SD bus between the host 140 and memory system 100. As noted, the SD commands may be sent over the PCIe interface 120b in the configuration of FIG. 1C. Another difference is that the host 140 does not have an NVMe host 32 in the configuration of FIG. 1C. Since many details of the configuration of FIG. 1C are similar to the configuration of FIG. 1B, that discussion will not be repeated.

Figure 2A:
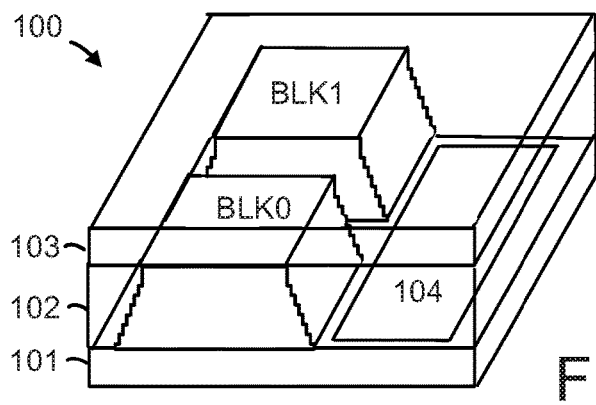
FIG. 2A is a perspective view of a set of blocks in a 3D stacked non-volatile memory device.

Technology described herein may be used with a variety of types of non-volatile memory. One example is a three-dimensional (3D) non-volatile memory system. However, embodiments may also be practiced in two-dimensional (2D) non-volatile memory system. FIGS. 2A-4 describe one example of a memory system 100 that can be used to implement the technology proposed herein. The memory system in FIGS. 2A-4 may be used in memory system 100 in FIG. 1B or 1C. FIG. 2A is a perspective view of a set of blocks in a 3D stacked non-volatile memory device. The memory system 100 includes a substrate 101. On and above the substrate are example blocks BLK0 and BLK1 of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2B:
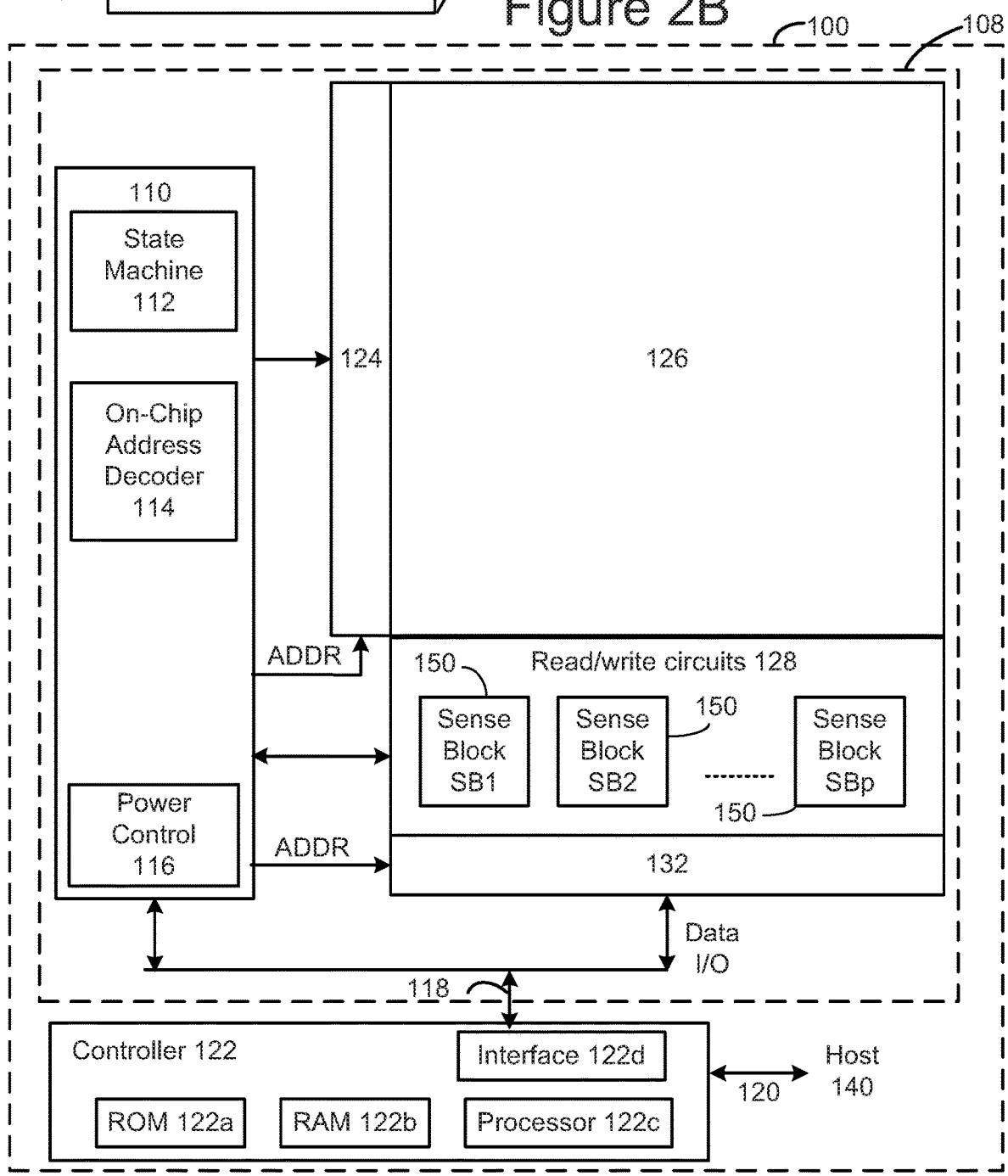
FIG. 2B is a functional block diagram of a memory device such as the 3D stacked non-volatile memory device of FIG. 2A.

FIG. 2B is a functional block diagram of an example memory device such as the 3D stacked non-volatile memory device 100 of FIG. 2B. The components depicted in FIG. 2B are electrical circuits. Memory device 100 includes one or more memory die 108. Each memory die 108 includes a three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a controller 122 is included in the same memory device 100 (e.g., a removable storage card) as the one or more memory die 108. However, in other systems, the controller can be separated from the memory die 108. In some embodiments controller 122 will be on a different die than memory die 108. In some embodiments, one controller 122 will communicate with multiple memory die 108. In other embodiments, each memory die 108 has its own controller. Commands and data are transferred between the host 140 and controller 122 via interface 120, and between controller 122 and the one or more memory die 108 via lines 118. In one embodiment, memory die 108 includes a set of input and/or output (I/O) pins that connect to lines 118. Communication interface 120 may include a physical and/or wireless channel between the host 140 and memory system 100. Communication interface 120 may include one or more of a number of known interfaces, such as Secure Digital (SD), and/or Peripheral Computer Interconnect Express (PCIe).

In one embodiment, controller 122 contains the SD-NVMe manager 40, NVMe controller 70, as well as storage for the NVMe submission queue 50, and NVMe completion queue 60. Thus, controller 122 may be spread over two packages 40, 45, as in the configuration of FIG. 1B. Controller 122 may be within a single semiconductor package, as in the configuration of FIG. 1C. In one embodiment, the processor 122c is used to implement the buffer manager 42, NVMe host 34, and NVMe controller 70 from the configuration of any of FIGS. 1A, 1B, and/or 1C. In one embodiment, code is stored in ROM 122a, which when executed on processor 122c, implements the buffer manager 42, NVMe host 34, and NVMe controller 70 from the configuration of any of FIGS. 1A, 1B, and/or 1C. In one embodiment, RAM 122b is used to store the data buffer 44, NVMe submission queue 50, and NVMe completion queue 60 from the configuration of any of FIGS. 1A, 1B, and/or 1C.

Memory structure 126 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate. In one embodiment, memory structure 126 implements three dimensional NAND flash memory. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, power control module 116, sense blocks 150, read/write circuits 128, controller 122, processor 122c, and/or interface 120d can be considered one or more control circuits that performs the functions described herein.

The (on-chip or off-chip) controller 122 (which in one embodiment is an electrical circuit) may comprise one or more processors 122c, ROM 122a, RAM 122b, all of which are interconnected. Other embodiments can use state machines or other custom circuits designed to perform one or more functions. The storage devices (ROM 122a, RAM 122b) comprises code such as a set of instructions, and the processor 122c is operable to execute the set of instructions to provide at least some of the functionality described herein. Alternatively or additionally, processor 122c can access code from a storage device in the memory structure, such as a reserved area of memory cells connected to one or more word lines. Memory interface 122d, in communication with ROM 122a, RAM 122b and processor 122c, is an electrical circuit (electrical interface) that provides an electrical interface between controller 122 and one or more memory die 108. For example, memory interface 122d can change the format or timing of signals, provide a buffer, isolate from surges, latch I/O, etc. Processor 122c can issue commands to control circuitry 110 (or any other component of memory die 108) via Memory Interface 122d.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Figure 2C:
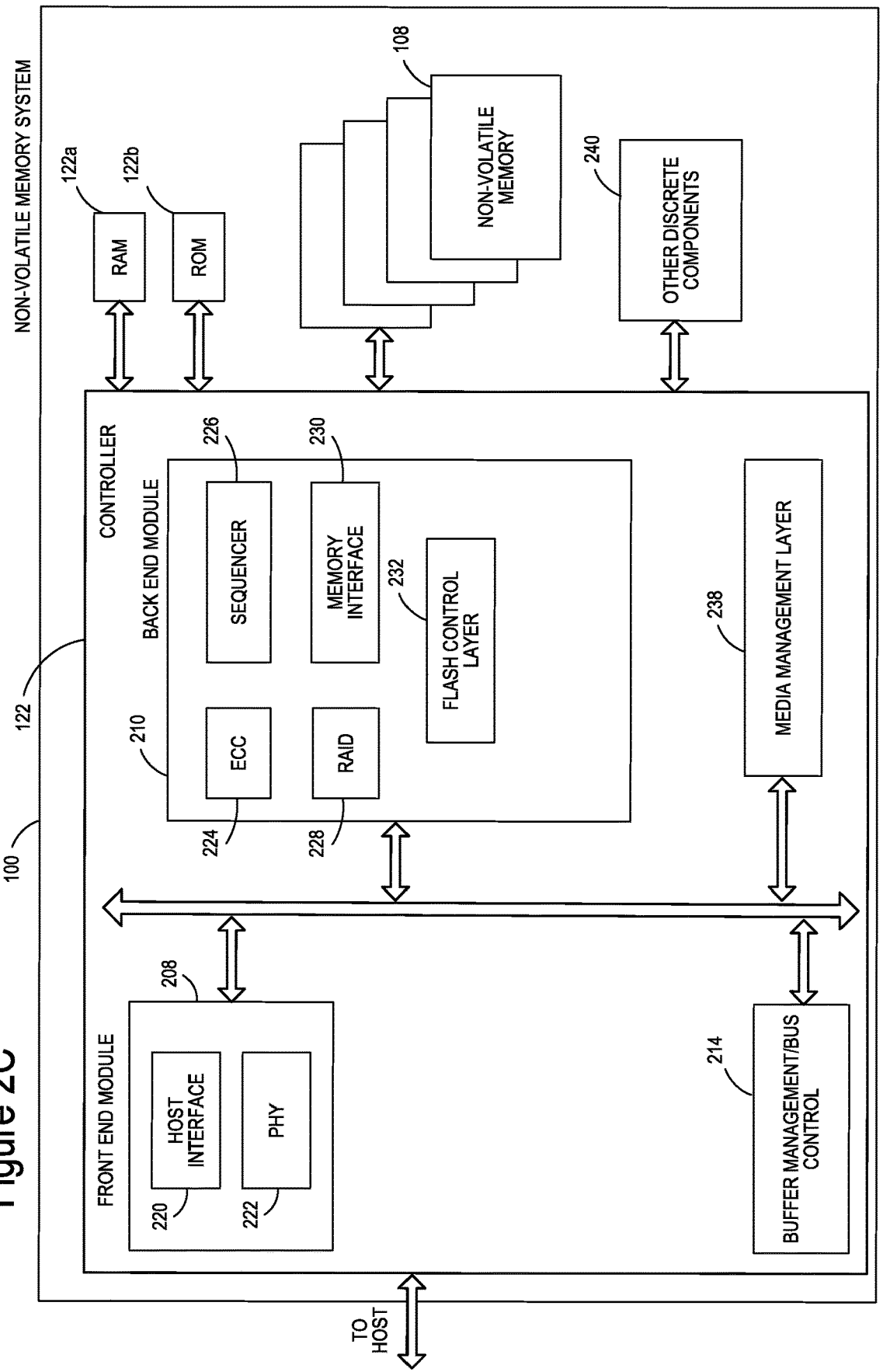
FIG. 2C is a block diagram of example memory system, depicting more details of Controller and Host.

FIG. 2C is a block diagram of example memory system 100, depicting more details of one embodiment of controller 122. As used herein, a memory controller is a device that manages data stored on memory and communicates with a host, such as a computer or electronic device. In one embodiment, the memory controller is a flash memory controller. However, memory controller 122 is not limited to controlling flash memory. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host. In other example, memory system 100 can be in the form of a solid state drive (SSD) drive.

In some embodiments, non-volatile memory system 100 includes a single channel between controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2C, controller 122 includes a front end module 208 that interfaces with a host, a back end module 210 that interfaces with the one or more non-volatile memory die 108, and various other modules that perform functions which will now be described in detail.

The components of controller 122 depicted in FIG. 2C may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for controller 122 to perform the functions described herein. The architecture depicted in FIG. 2C is one example implementation that may (or may not) use the components of controller 122 depicted in FIG. 2B (i.e. RAM, ROM, processor).

Referring again to modules of the controller 122, a buffer manager/bus control 214 manages buffers in random access memory (RAM) 122b and controls the internal bus arbitration of controller 122. These buffers may include write buffers and read buffers. RAM may be used as a temporary buffer to store data from host 140 to be written to non-volatile memory 108. RAM may also be used as a temporary buffer to store data read from non-volatile memory 108 to be transferred to host 140. The buffer manager/bus control 214 may also control the internal bus arbitration of Controller 122. A read only memory (ROM) stores system boot code. Note that the manager/bus control 214 includes the buffer manager 42 in the SD-NVMe manager 40, in one embodiment. Thus, manager/bus control 214 may be used to manage data buffer 44. In one embodiment, the data buffer 44 is implemented in RAM 122b. In one embodiment, the NVMe submission queues 50 are implemented in RAM 122b. In one embodiment, the NVMe completion queues 60 are implemented in RAM 122b.

A read only memory (ROM) 122a stores system boot code. Although illustrated in FIG. 2C as located separately from the controller 122, in other embodiments one or both of the RAM 122b and ROM 122a may be located within the controller. In yet other embodiments, portions of RAM and ROM may be located both within the controller 122 and outside the controller. Further, in some implementations, the controller 122, RAM 122b, and ROM 122a may be located on separate semiconductor die.

Front end module 208 includes a host interface 220 and a physical layer interface (PHY) 222 that provide the electrical interface with the host or next level storage Controller. In one embodiment, the PHY includes a physical interface that is compliant with Peripheral Component Interconnect Express (PCIe). In one embodiment, the PHY includes a physical interface that is compliant with Secure Digital (SD).

The host interface 220 typically facilitates transfer for data, control signals, and timing signals. The choice of the type of host interface 220 can depend on the host system 140. In some embodiments, host interface 220 is compliant with Secure Digital (SD). Secure Digital is a logical device interface that may be used to access non-volatile storage attached when using an SD bus between the host 140 and the memory system 100. However, note that host interface 220 is not limited to Secure Digital.

In some embodiments, host interface 220 is compliant with NVM Express (NVMe). NVMe is a logical device interface that may be used to access non-volatile storage attached when using a PCIe bus between the host 140 and the memory system 100. However, note that host interface 220 is not limited to NVMe.

Back end module 210 includes an error correction code (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of system 100 illustrated in FIG. 2C include media management layer 238, which performs wear leveling of memory cells of non-volatile memory die 108. System 100 also includes other discrete components 240, such as external electrical interfaces, external RAM, resistors, capacitors, or other components that may interface with controller 122. In alternative embodiments, one or more of the physical layer interface 222, RAID module 228, media management layer 238 and buffer management/bus controller 214 are optional components that are not necessary in the controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory 126 of die 108. The MML 238 may be needed because: 1) the flash memory may have limited endurance; 2) the flash memory 126 may only be written in multiples of ECC pages; and/or 3) the flash memory 126 may not be written unless it is erased as a block. The MML 238 understands these potential limitations of the flash memory 126 which may not be visible to the host. Accordingly, the MML 238 attempts to translate the writes from host into writes into the flash memory 126.

Controller 122 may interface with one or more memory dies 108. In one embodiment, controller 122 and multiple memory dies (together comprising non-volatile storage system 100) implement a solid state drive (SSD), which can emulate, replace or be used instead of a hard disk drive inside a host, as a NAS device, laptop, tablet, etc. Additionally, the SSD need not be made to work as a hard drive.

Figure 3:
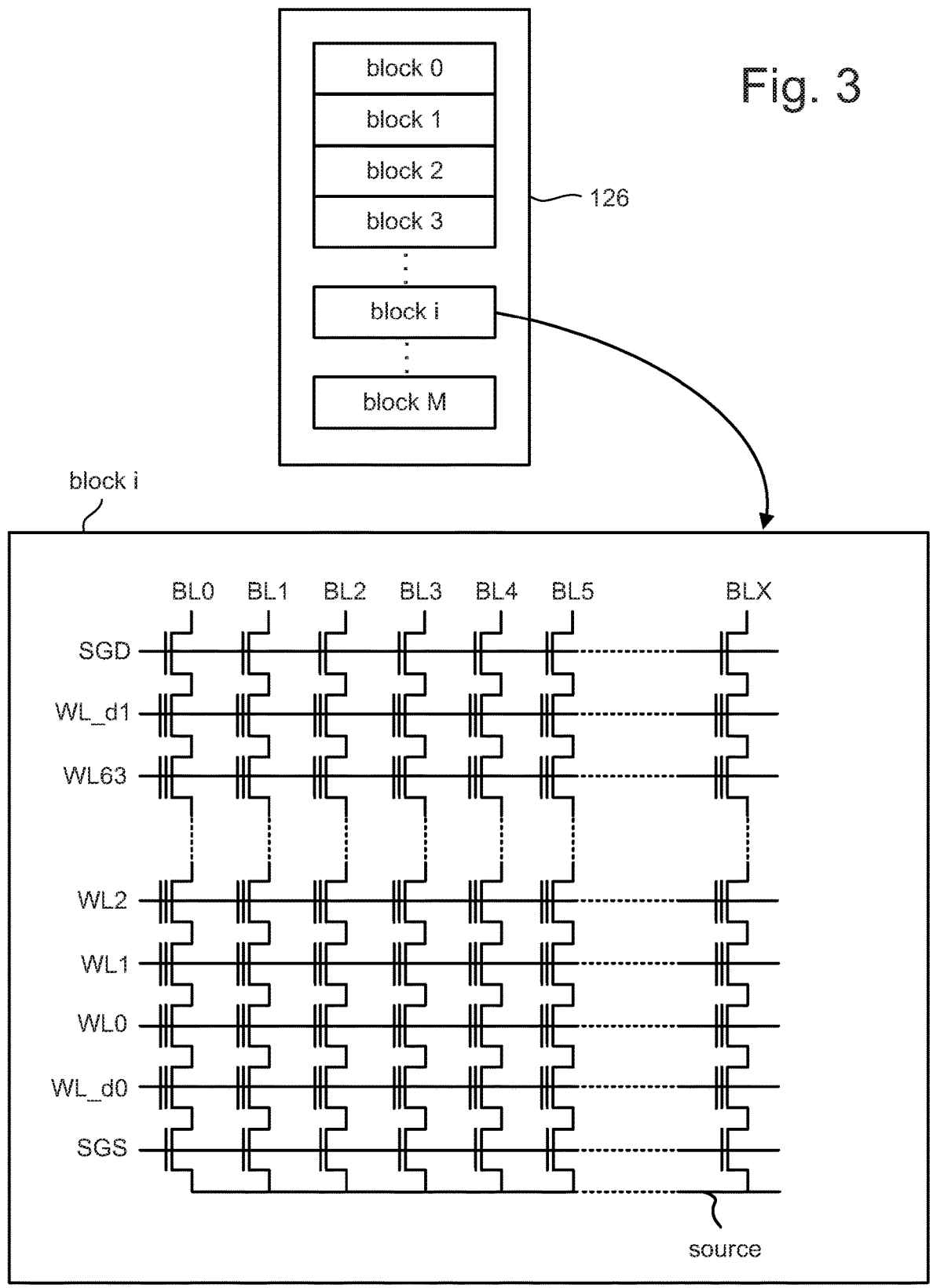
FIG. 3 depicts an exemplary structure of memory cell array.

FIG. 3 depicts an exemplary structure of memory cell array 126. In one embodiment, the array of memory cells is divided into M blocks of memory cells. The block is the unit of erase. That is, each block contains the minimum number of memory cells that are erased together. Each block is typically divided into a number of pages. Note that herein, these pages may be referred to as "ECC pages." An ECC page is a unit of programming. One or more ECC pages of data are typically stored in one row of memory cells. An ECC page can store one or more sectors. A sector includes user data and overhead data. Overhead data typically includes parity bits of an Error Correction Code (ECC) that have been calculated from the user data of the sector. A portion of the controller calculates the ECC parity when data is being programmed into the array, and also checks it when data is being read from the array. Alternatively, the ECCs and/or other overhead data are stored in different ECC pages, or even different blocks, than the user data to which they pertain.

FIG. 3 also shows more details of one embodiment of block i of memory array 126. Block i includes X+1 bit lines and X+1 NAND strings. There may be thousands of NAND strings in a block. Block i also includes 64 data word lines (WL0-WL63), 2 dummy word lines (WL_d0 and WL_d1), a drain side select line (SGD) and a source side select line (SGS). One terminal of each NAND string is connected to a corresponding bit line via a drain select gate (connected to select line SGD), and another terminal is connected to the source line via a source select gate (connected to select line SGS). Because there are sixty four data word lines and two dummy word lines, each NAND string includes sixty four data memory cells and two dummy memory cells. In other embodiments, the NAND strings can have more or fewer than 64 data memory cells and more or fewer dummy memory cells. Data memory cells can store user or system data. Dummy memory cells are typically not used to store user or system data. Some embodiments do not include dummy memory cells.

In some embodiments, programming is performed one word line at a time. That is, only memory cells connected to one word line are programmed at one time. Moreover, for efficiency, when programming a word line, all of the memory cells on the word line may be programmed. Typically, multiple ECC pages are programmed into the memory cells associated with one word line. The number of ECC pages may depend on how many bits are programmed per memory cell. For example, if one bit is programmed per memory cell, then four, eight, sixteen, or some other number of ECC pages might be programmed per word line.

Memory cells may be programmed to store two levels of charge (or some other physical parameter such as resistance) so that a single bit of data is stored in each cell. This is typically referred to as a binary or single level cell (SLC) memory. SLC memory may store two states. Alternatively, the memory cells may be operated to store more than two detectable levels of charge (or some other physical parameter such as resistance), thereby to store more than one bit of data in each. This latter configuration is referred to as multi-level cell (MLC) memory. For example, MLC memory may store four states and can retain two bits of data. As another example, MLC memory may store eight states and can retain three bits of data. Both types of memory cells may be used in a memory, for example binary SLC flash memory may be used for caching data and MLC memory may be used for longer term storage. In some embodiments, the memory system has a pool of blocks used for SLC programming and a pool of blocks used for MLC programmed. These are referred to as SLC block and MLC blocks, respectively. In one embodiment, the memory controller 122 initially stores host data in SLC blocks, and then performs a folding operation in which data is transferred from one or more SLC blocks to an MLC block.

Figure 4:
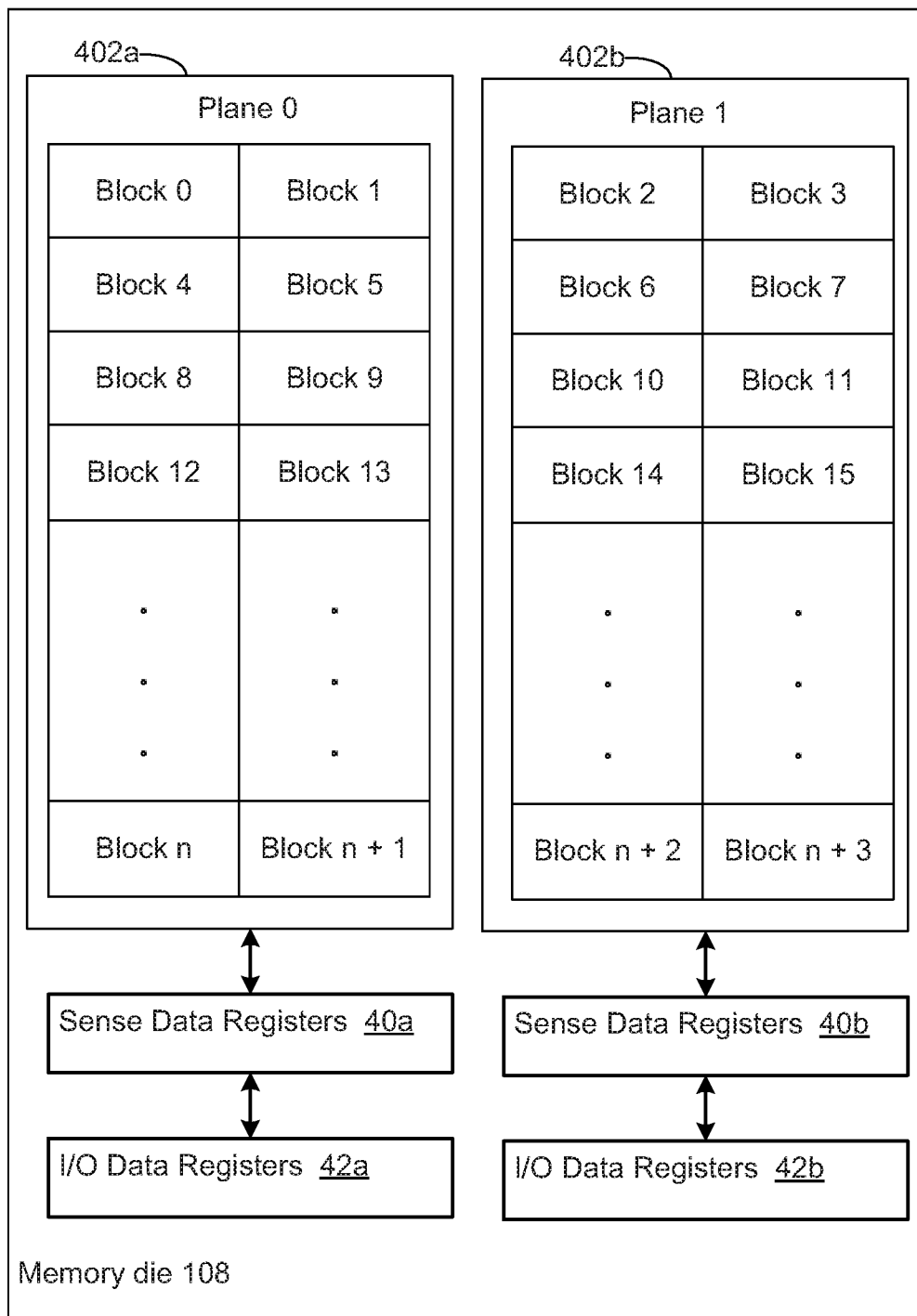
FIG. 4 depicts one example of a memory die having two planes.

To achieve better parallelism, a memory die (or other logical unit) can be divided into multiple planes. A plane may be defined as a unit that is able to report its own operating status and can perform command execution independent of other planes in the memory die. For example, each plane may have its own data registers, data buffer, etc., to enable independent command operation. FIG. 4 depicts one example of a memory die 108 having two planes (Plane 0, 402a; Plane 1, 402b). In this example, Plane 0 has Blocks 0, 1, 4, 5, 8, 9, 12, 13, . . . n, n+1. Plane 1 has Blocks 2, 3, 6, 7, 10, 11, 14, 15, n+2, n+3. This is just one example of how blocks might be addressed for a two plane memory die 108.

Note that Sense Data Registers 40a are able to store data sensed from a group of memory cells in one of the blocks in Plane 0 402a. Likewise, Sense Data Registers 40b are able to store data sensed from a group of memory cells in one of the blocks in Plane 1 402b. Thus, memory cells in one block in Plane 0 may be sensed concurrently with memory cells in one block in Plane 1.

Moreover, data in Sense Data Registers 40a may be used to store data to be programmed into a group of memory cells in one of the blocks in Plane 0 402a. Likewise, data in Sense Data Registers 40b may be used to store data to be programmed into a group of memory cells in one of the blocks in Plane 1 402b. Thus, memory cells in one block in Plane 0 may be programmed concurrently with memory cells in one block in Plane 1. Moreover, there is a separate set of I/O data registers 42*a*, 42*b* associated with each plane 402*a*, 402*b*.

In one embodiment, the memory die programs one or more ECC pages into a group of memory cells in one of the blocks in Plane 0, while also programming one or more ECC pages into a group of memory cells in one of the blocks in Plane 1. Only one word line in a plane is programmed at one time, in some embodiments. Hence, the memory die programs multiple ECC pages into memory cells on one word line in Plane 0, while also programming multiple ECC pages into memory cells on one word line in Plane 1, in one embodiment. Herein, the term "maximum unit of programming" refers to the maximum amount of data that can be concurrently programmed into memory cells on a memory die 108. The maximum unit of programming will depend on the number of bits programmed per memory cell. For example, the memory die could concurrently program eight ECC pages into a block in Plane 0, and another eight ECC pages into a block in Plane 1, if programming a single bit per memory cell. Thus, the maximum unit of programming in this SLC example is 16 ECC pages. Note that the maximum number of memory cells that can be concurrently programmed does not depend on the number of bits per cell, in one embodiment.

Figure 5:
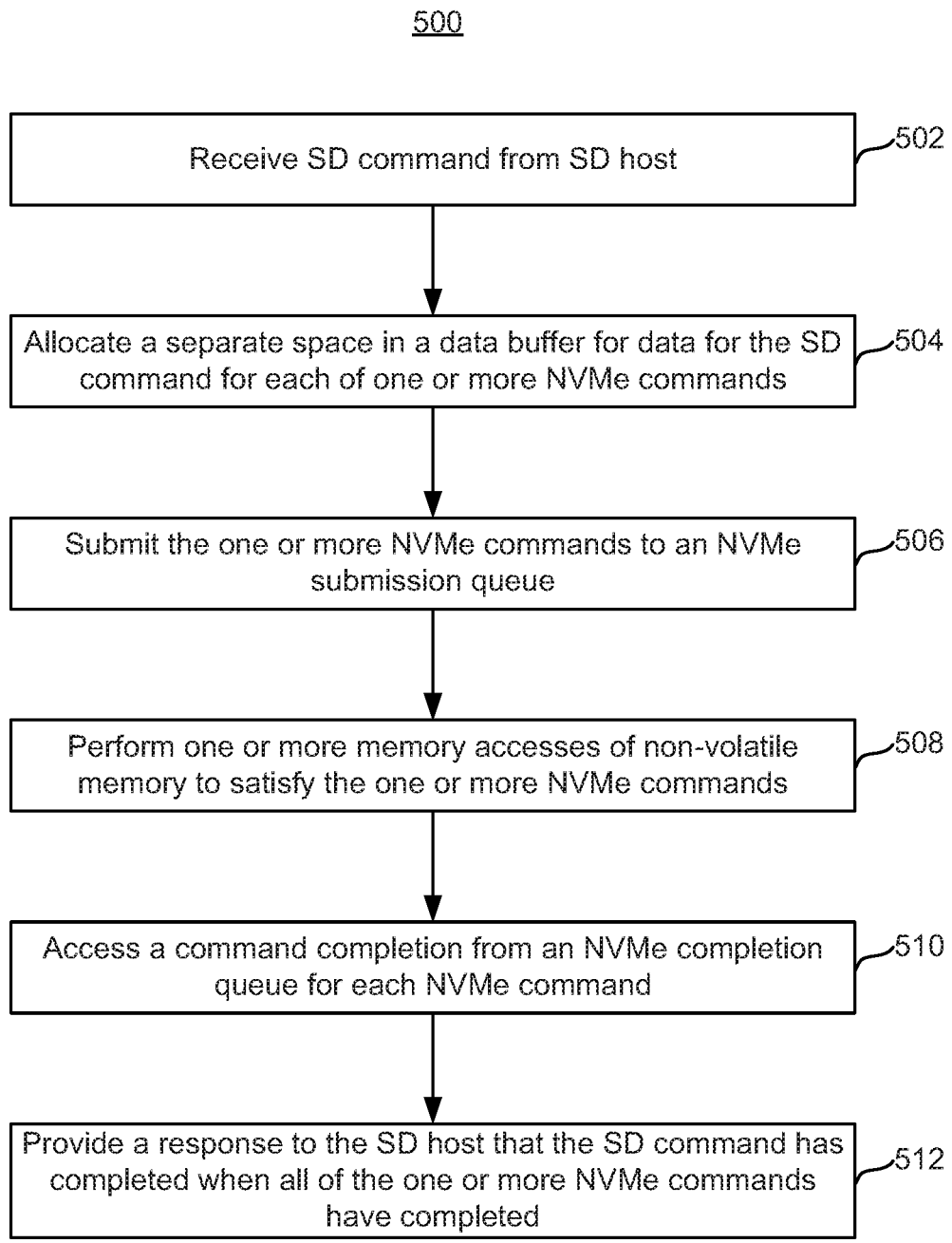
FIG. 5 is a flowchart of one embodiment of a process of operating non-volatile storage.

FIG. 5 is a flowchart of one embodiment of a process 500 of operating non-volatile storage. The process 500 describes processing of one SD command received from an SD host 30 at a memory system 100. The process 500 may be performed by memory system 100 of FIG. 1B, 1C, 2A, 2B, or 2C, but is not limited thereto. Note that the order of the steps is described for convenience of explanation. There may be some overlay between some steps, and some steps may be performed more than once. The process 500 may apply to a read or write command.

Step 502 includes receiving an SD command from an SD host 30. In one embodiment, the SD command is provided to memory system 100 by host 140 over SD interface 80, as in the configuration of FIG. 1B. In one embodiment, the SD command is provided to memory system 100 by host 140 over PCIe interface 120*b*, as in the configuration of FIG. 1C. For example, SD host 30 may provide the SD command.

Figure 6A:
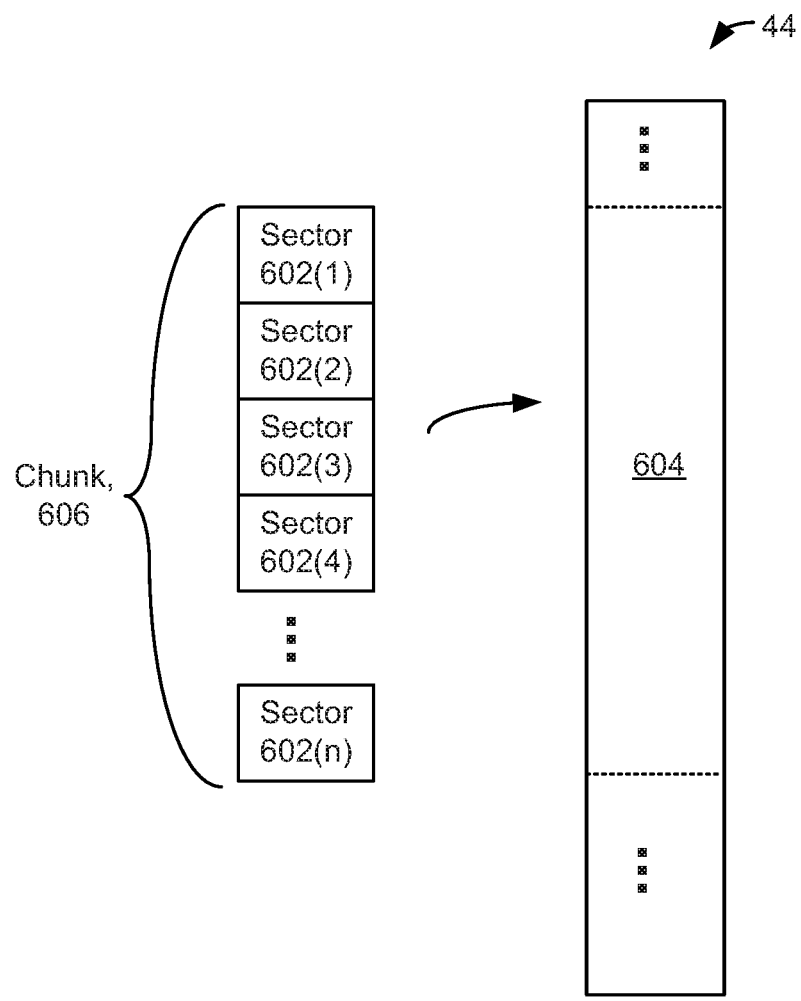
FIG. 6A depicts how sectors of data for an SD command are chunked together and stored into data buffer, in one embodiment.
Figure 6B:
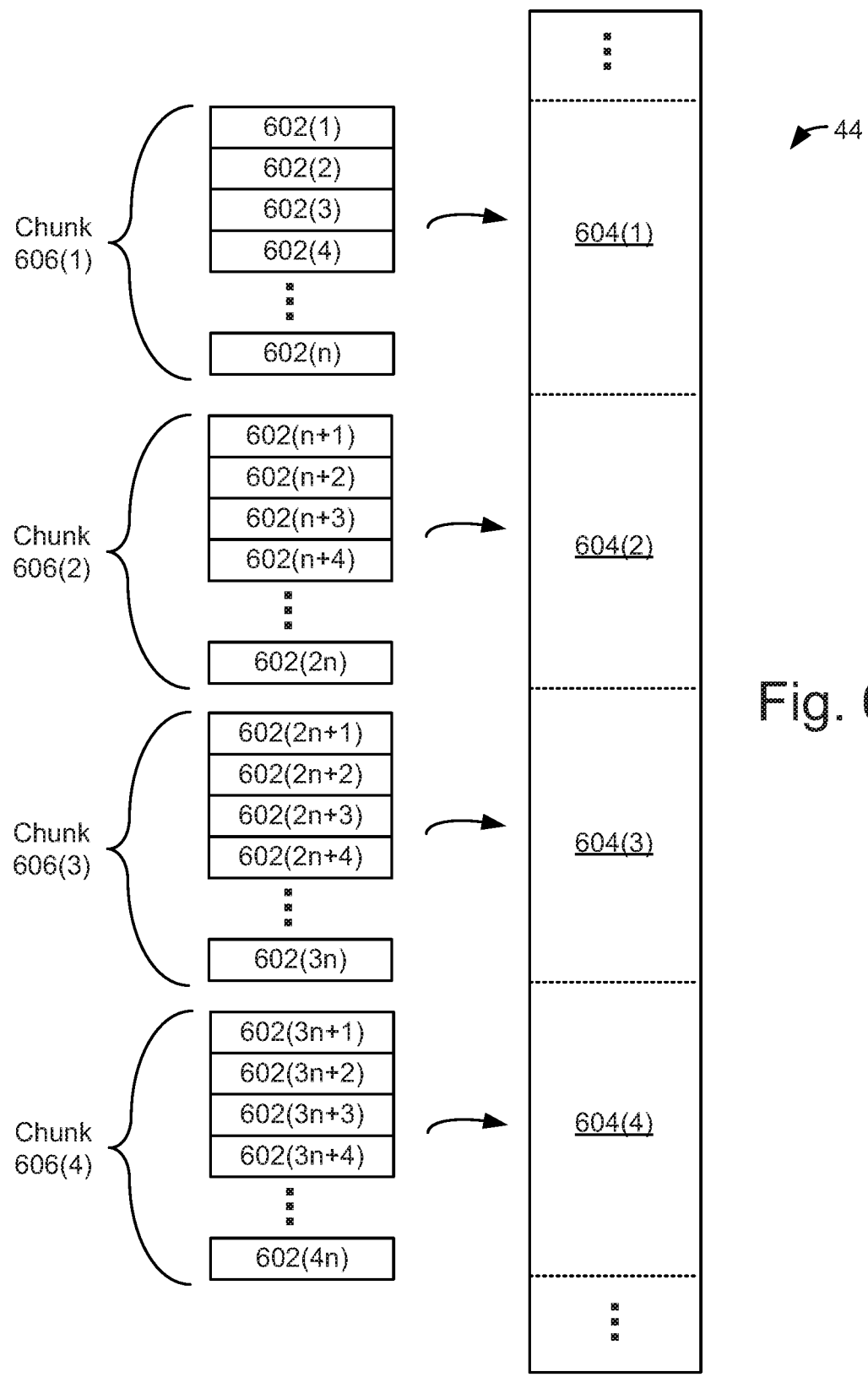
FIG. 6B depicts how sectors of data for an SD command are chunked together and stored into data buffer, in one embodiment.
Figure 6C:
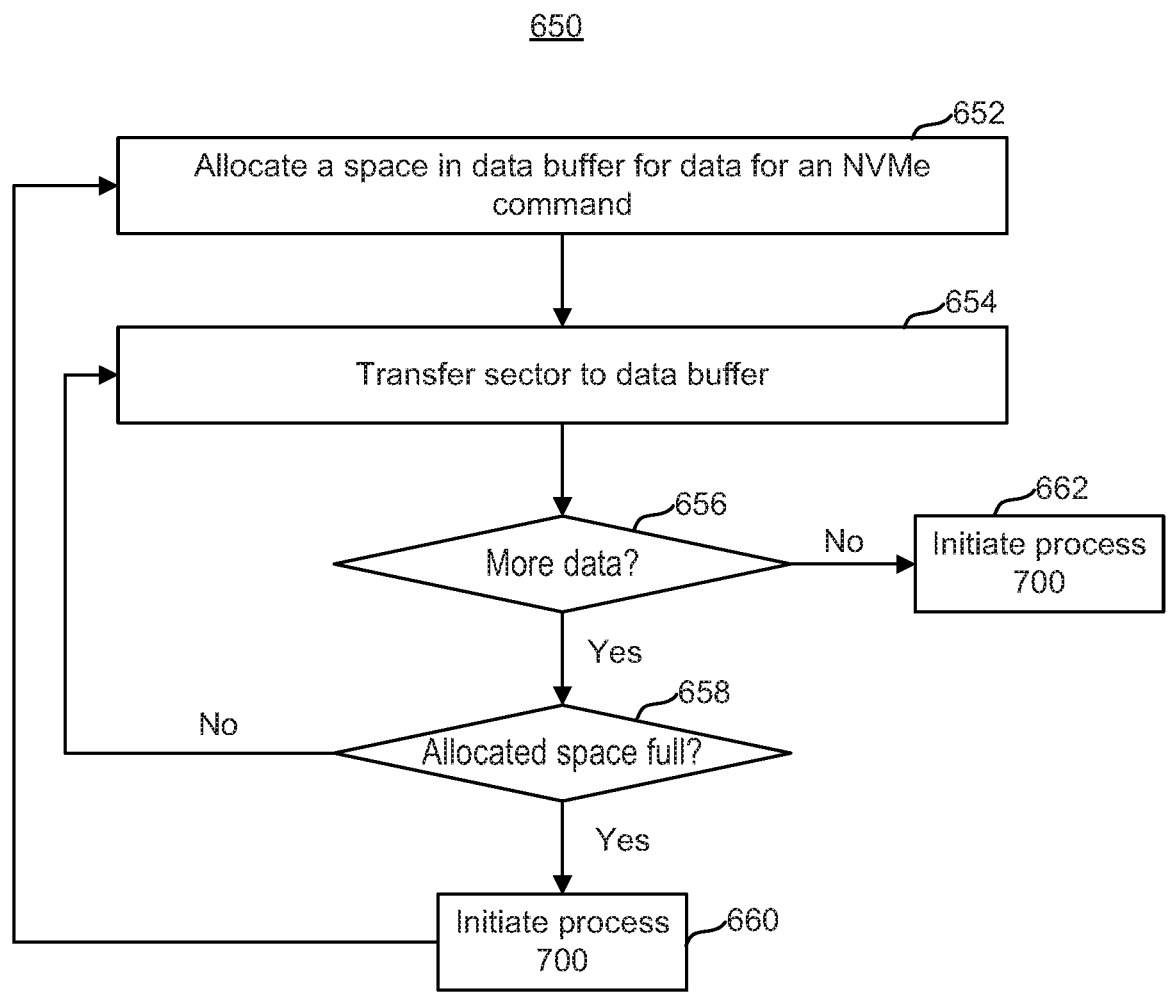
FIG. 6C is a flowchart of one embodiment of a process of managing a data buffer.

Step 504 includes the SD-NVMe manager 40 allocating a separate region in the data buffer 44 for data for the SD command for each of one of more NVMe commands. Briefly, there may be multiple sectors of data associated with an SD command. The SD-NVMe manager 40 may form a chunk from one or more sectors. That chunk may be assigned a region in the data buffer 44. FIGS. 6A-6C provide further details for one embodiment of step 504.

Figure 7:
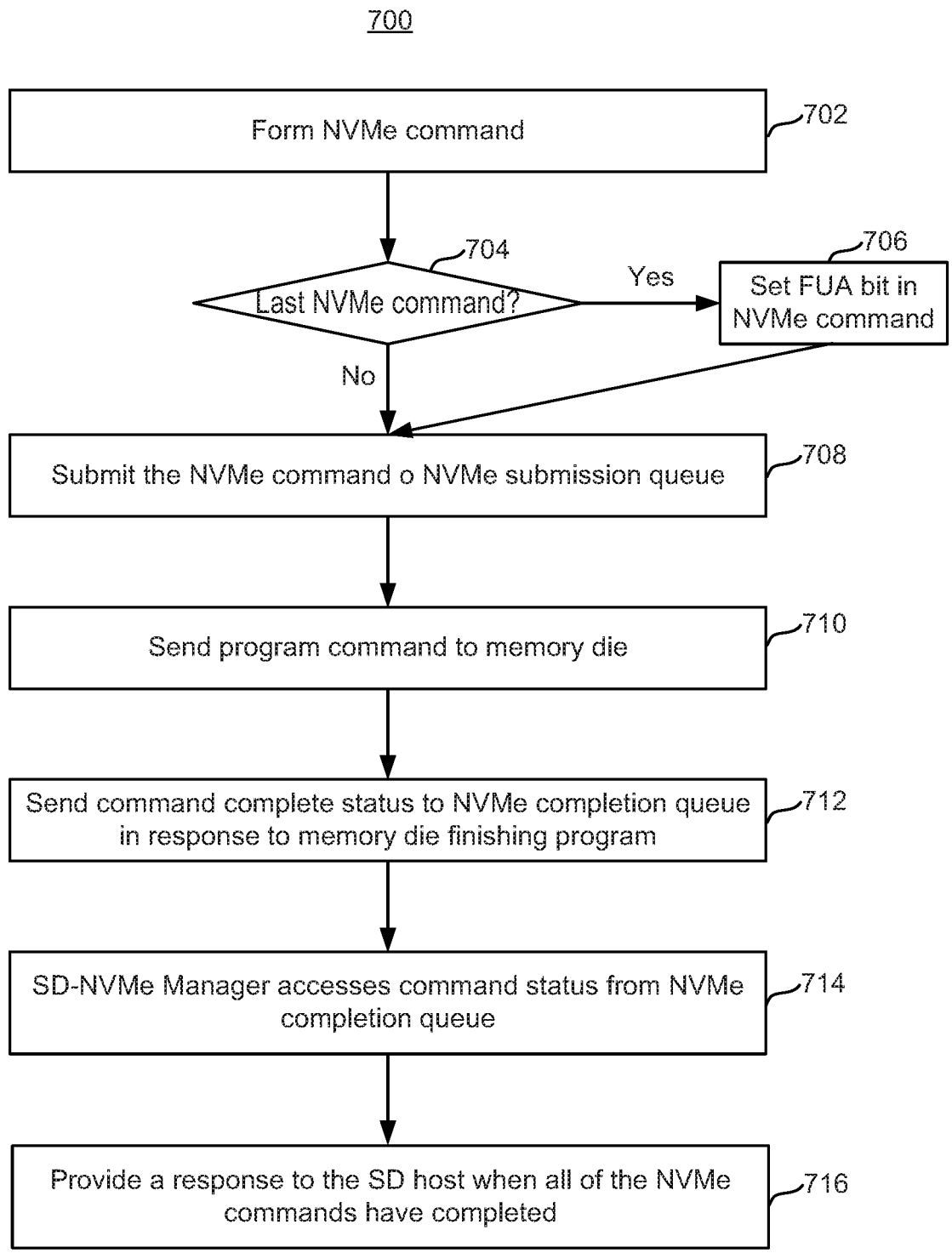
FIG. 7 is a flowchart of one embodiment of a process of processing an NVMe command.

Step 506 includes the SD-NVMe manager 40 submitting one or more NVMe commands to an NVMe submission queue 50. In one embodiment, the SD-NVMe manager 40 submits the NVMe command(s) over PCIe interface 95. In one embodiment, the SD-NVMe manager 40 submits the NVMe command(s) without using a PCIe interface. Steps 702-708 of process 700 in FIG. 7 provide further details for one embodiment of step 506.

Step 508 includes performing one or more memory access commands of non-volatile memory 126 to satisfy the one of more NVMe commands. In one embodiment, controller 122 sends the one or more memory access commands over interface 118 to a memory die 108. Circuitry on the memory die 108 may perform the memory access. For example, the control circuitry 110, decoders 124/132 and read/write circuits 128 may perform the memory access.

Step 510 includes accessing a command completion from an NVMe completion queue 60 for each NVMe command. The SD-NVMe manager 40 may perform step 510. In one embodiment, the SD-NVMe manager 40 accesses the SD-NVMe manager 40 from across PCIe interface 95. In one embodiment, the SD-NVMe manager 40 accesses the SD-NVMe manager 40 without use of a PCIe interface.

Step 512 includes the SD-NVMe manager 40 providing a response to the host 140 that the SD command has completed. Step 512 is performed in response to all of the NVMe commands for the SD command having completed. In one embodiment, SD-NVMe manager 40 provides the response over SD interface 120*a* to SD host 30. In one embodiment, SD-NVMe manager 40 provides the response over PCIe interface 120*b* to SD host 30.

In some embodiments, the SD-NVMe manager 40 has a default size for the allocation of regions in the data buffer 44. In some cases, the total amount of data for an SD command is less than or equal to the default size. FIG. 6A depicts how sectors 602 of data for an SD command are chunked together and stored into data buffer 44, in one embodiment. A total of "n" sectors 602 make up a chunk 606, in this example. For a write command a "sector" is a unit of data transferred from the host 140 to the memory system 100. For a read command a "sector" is a unit of data transferred from the memory system 100 to the host 140. Region 604 of data buffer 44 is allocated for chunk 606. As one example, each sector 602 might be 512 bytes, the region 604 might be 32 kB, wherein "n" may be 64. Note that "n" could be any integer. The sectors 602 could be larger or smaller than 512 bytes. The region 604 could be larger or smaller than 32 kB. Note that for a write command, the sectors 602(1)-602(*n*) may be provided by host 140. For a read command, the sectors 602(1)-602(*n*) may be provided by reading the non-volatile memory 126.

In some cases, the total amount of data for an SD command is greater than the default size of buffer allocation. FIG. 6B depicts how sectors 602 of data for an SD command are chunked together and stored into data buffer 44, in one embodiment. As with the example of FIG. 6A, a total of "n" sectors 602 make up a chunk 606. However, in this example, there are four chunks 606(1)-606(4). Chunk 606(1) has sectors 602(1) to 602(*n*); chunk 606(2) has sectors 602(*n*+1) to 602(2*n*); chunk 606(3) has sectors 602(2*n*+1) to 602(3*n*); chunk 606(4) has sectors 602(3*n*+1) to 602(4*n*). Each chunk 606 is allocated its own region 604(1)-604(4) in the data buffer 44. For example, chunk 606(1) is allocated to region 604(1); chunk 606(2) is allocated to region 604(2); chunk 606(3) is allocated to region 604(3); and chunk 606(4) is allocated to region 604(4). Note that each chunk 606(1) to 606(4) is associated with one NVMe command, in one embodiment. Thus, region 604(1) may be associated with a first NVMe command, region 604(2) may be associated with a second NVMe command, region 604(3) may be associated with a third NVMe command, and region 604(4) may be associated with a fourth NVMe command.

FIG. 6C is a flowchart of one embodiment of a process 650 of managing data buffer 44. Process 650 describes how regions 604 may be allocated in data buffer 44 for an SD write command, as well as how the data may be transferred into data buffer 44. Process 650 may be performed by SD-NVMe manager 40. The process 650 may be performed in memory system 100 of FIG. 1B, 1C, 2A, 2B, or 2C, but is not limited thereto. Some of the steps of process 650 may be used during step 504 of process 500 to allocate a region 604 in the data buffer 44. Thus, process 650 may be performed after receiving an SD write command from an SD host 30.

Step 652 includes allocating a region 604 in data buffer 44 for data for an NVMe command. With reference to FIG. 6A, region 604 may be allocated for an NVMe command. With reference to FIG. 6B, region 604(1) may be allocated, for example. The region has a default size, in one embodiment. The default size may be adapted for efficient memory array operations. For example, with reference to FIG. 3, one word line in a block is read or programmed at a time, in one embodiment. Thus, for efficient operation, it may be convenient to program or read an entire word line. With reference to FIG. 4, in some architectures, a word line in two (or more planes) on a memory die 108 can be programmed or read concurrently. For efficient operation, it may be convenient to program a selected word line in a selected block in Plane 0 while concurrently programming a selected word line in a selected block in Plane 1. Likewise, for efficient operation, it may be convenient to read a selected word line in a selected block in Plane 0 while concurrently programming a selected word line in a selected block in Plane 1. In these examples it might be that 16 kB, 32 kB, or some other unit of data is programmed or read on the memory die as one unit. In one embodiment, the default size of the region allocated in the buffer is equal to this unit of data. However, as will be described below, under certain conditions that amount of space allocated in the data buffer 44 may be changed to, for example, help meeting timing constraints of SD commands.

Step 654 includes transferring a sector 602 of data for the SD command to the allocated region in the data buffer 44. Step 654 refers to transferring data from host 140 to the data buffer 44.

Step 656 is a determination of whether there is more data for the SD command. In some cases, the SD-NVMe manager 40 is aware of the total amount of data for the SD command, and hence makes this determination based on a comparison of the amount of data added to the buffer 44 with the total amount of data for the SD command. In some cases, the write command is open-ended, which means that the SD host 30 may end transmission of data at any time. The SD host 30 may send a stop transmission command to the memory system 100, to indicate that there is no more data for the SD command. Thus, upon receiving a stop transmission command, the process 650 concludes at step 662. Step 662 includes initiating process 700 of FIG. 7. Briefly, process 700 describes how an NVMe command may be formed, submitted to the NVMe submission queue 50, etc.

If there is more data (step 656=yes), then step 658 may be performed. Step 658 is a determination of whether the allocated region 604 in the data buffer 44 is full. If the allocated region 604 is full (step 658=yes), then process 700 in FIG. 7 may be initiated. As noted, process 700 describes how an NVMe command may be formed, submitted to the NVMe submission queue 50, etc. Also, the process 650 returns to step 652 to allocate another region 604 in the data buffer 44. Thus, note that processing of an NVMe command associated with the region 604 in the data buffer 44 may start while additional sector data (for other NVMe commands) is being transferred to the data buffer.

If the allocated region 604 is not full (step 658=no), then the process 650 returns to step 654. In step 654 another sector of data is transferred to the allocated region 604 in the data buffer 44.

At some point it may be determined in step 656 that there is no more data for the SD command. In this event, step 662 may be performed. In step 662, process 700 may be initiated. Note that when there is no more data, the allocated region 604 in the data buffer 44 might or might not be full. Even if the allocated region is not full, process 700 may be initiated to form an NVMe command, submit the NVMe command to the NVMe submission queue 50, etc.

Note that the buffer allocations depicted in FIGS. 6A and 6B may applied to reads, as well as writes. The process of transferring data to the data buffer 44 may be different for a read than for the write, as depicted in FIG. 6C. For example, the timing of when the NVMe commands are formed and issued may be different. More particularly, an NVMe command may be formed and initiated prior to transferring data into the region 604 of the data buffer 44 that is allocated for the NVMe command.

FIG. 7 is a flowchart of one embodiment of a process 700 of processing an NVMe command. Process 700 describes one embodiment in which the SD command is a write command. As noted above, the process 700 may be initiated in step 660 after the region allocated to an NVMe command in the data buffer 44 is full, or in step 662 if there is no more data to transfer for an SD write command.

Step 702 includes the SD-NVMe manager 40 forming an NVMe command. The NVMe command may specify the location of the region 604 in data buffer 44. The NVMe command could specify the physical location in memory (e.g., data buffer 44) by use of, for example, Physical Region Page (PRP) entries or Scatter Gather Lists. Physical Region Page (PRP) entries and Scatter Gather Lists are known in connection with NVMe.

Step 704 is a determination of whether this is the last NVMe command for the SD command. The SD-NVMe manager 40 may make this determination based on whether process 650 ended after step 656. For example, if the SD-NVMe manager 40 determined, in step 656, that there was no more data, then this is the last NVMe command for the SD command.

If this is the last NVMe command, then the SD-NVMe manager 40 sets a forced unit access (FUA) bit in the NVMe command. Whether or not the FUA bit is set, step 708 is performed next. Step 708 includes the SD-NVMe manager 40 submitting the NVMe command to the NVMe submission queue 50.

Step 710 includes a memory controller 122 sending a program command to a memory die 108. For example, back end module 210 may send a program command to a memory die 108. In one embodiment, this is an ONFI command. However, the program command is not limited to ONFI.

Step 712 includes memory controller 122 adding a command status to the NVMe completion queue 60 in response to the memory die 108 finishing the programming. When the memory die 108 finishes programming it may send status to the memory controller over, for example, memory interface 230. The memory controller 122 may then modify an entry on the NVMe completion queue 60. In one embodiment, NVMe controller 70 writes to the NVMe completion queue 60. The NVMe controller 70 writes a completion queue entry to the next free slot 68 in the NVMe completion queue 60, in one embodiment. The NVMe controller 70 optionally generates an interrupt to the NVMe host 34 in the SD-NVMe manager 40 to indicate that there is a new entry available.

Step 714 includes the SD-NVMe manager 40 accessing the NVMe completion queue 60 to determine the status of one or more NVMe commands. The SD-NVMe manager 40 may perform step 714 in response to the interrupt mentioned in step 712. However, the interrupt is not required. The SD-NVMe manager 40 could access the NVMe completion queue 60 at any time to check for new entries to process. In one embodiment, the NVMe host 34 writes to a completion queue doorbell register to indicate that an NVMe completion queue entry has been consumed.

Step 716 includes providing a response to the SD host 30 when all of the NVMe commands for the SD command have completed. The response could indicate success, failure, etc.

In one embodiment, the SD-NVMe manager 40 performs throttling to help enforce SD command timings. Timing requirements may be different for SD Commands than for NVMe commands. Timing for SD commands may be on a sector basis. For example, the timing requirements for SD commands may be enforced on a per block basis (a block in this context may also be referred to as a "sector"). However, the timing requirements for an NVMe command may be enforced on a per command basis. Embodiments of a memory system ensure that the timing requirements for SD commands are met even though a conversion from SD commands to NVMe commands is used.

A possible factor in the problem of meeting the SD timing constraint is that the memory system 100 may be performing garbage collection in the memory structure 126. The garbage collection may be needed if there is considerable fragmentation of data in the memory structure 126. Note that even if the memory system 100 is performing garbage collection, the timing constraints of NVMe commands may be complied with even without throttling. For example, the NVMe controller 70 might perform garbage collection and still meet timing constraints of the NVMe commands. However, the NVMe controller 70 might be unaware of timing constrains of the SD commands. Hence, the SD-NVMe manager 40 may perform throttling, in one embodiment, to enforce SD timing constraints.

The memory system 100 may be allowed a certain amount of time to program the sector in an SD command. For example, the memory system may have 250 ms to program the sector. As noted above, the SD-NVMe manager 40 may form a chunk 606 of data from one or more sectors. That chunk 606 may be the basis for an NVMe command. After a region 604 in data buffer is allocated, the SD-NVMe manager 40 may proceed to transfer as many sectors 602 as are needed to fill the region 604.

Note that this time limit is enforced per data block (e.g., per sector), and not per the entire write command. For a multiple block read operation, the memory system sends multiple data blocks over the data lines to the SD host. The memory system is allowed a certain amount of time between the sending of each of the data blocks. For example, the memory system may have 100 milliseconds (ms) between the sending of each of the data blocks (or "sectors"). Note that this time limit is enforced per data block (e.g., per sector), and not per the entire read command.

Figure 8A:
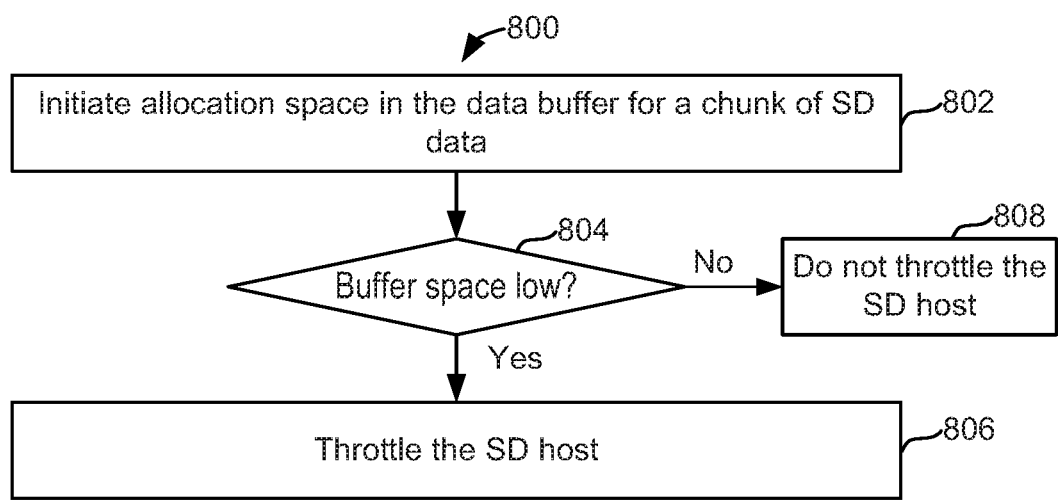
FIG. 8A is a flowchart of one embodiment of a process of operating in either a normal mode or throttling mode.

FIG. 8A is a flowchart of one embodiment of a process 800 of operating in either a normal mode or throttling mode. The process 800 may be performed by SD-NVMe manager 40. The process 800 may be performed by memory system 100 of FIG. 1B, 1C, 2A, 2B, or 2C, but is not limited thereto.

Step 802 includes the SD-NVMe manager 40 initiating allocation of region 604 in the data buffer 44 for a chunk 606 of SD data. The term "SD data" refers to data associated with either an SD write command or an SD read command. Step 802 may include the SD-NVMe manager 40 requesting a region 604 in the data buffer 44 from buffer management control 214.

Step 804 is a determination of whether data buffer space is low. The SD-NVMe manager 40 may compare the available data buffer space with one or more thresholds to make this determination. For example, low data buffer space may be defined as when the percent of available data buffer space falls below a threshold percentage, a threshold amount of bytes, etc.

If data buffer space is low (step 804=yes), then the SD-NVMe manager 40 throttles the SD host 30, in step 806. Throttling the SD host refers to slowing the rate of data transfer between host 140 and memory system 100 for an SD write command or an SD read command. In one embodiment, the SD-NVMe manager 40 reduces a size of regions 604 that are allocated per chunk 606, in step 806. For example, the buffer size might be reduced from 32 kB to 16 kB, 8 kB, 4 kB, or even one sector (e.g., 512 bytes).

If data buffer space is not low (step 804=no), then the SD-NVMe manager 40 does not throttle the SD host 30, in step 808. This may be referred to as a normal mode. In this mode, the SD host 30 may be permitted to operate at full bandwidth. In one embodiment, the SD-NVMe manager 40 uses a default size of regions 604 that are allocated per chunk 606, in step 808. For example, the default buffer size might be 32 kB. In one embodiment, the default buffer size is the maximum size that is used for regions 604. In one embodiment, the default buffer size is equal to a unit of programming or reading, such as one word line of memory cells.

Figure 8B:
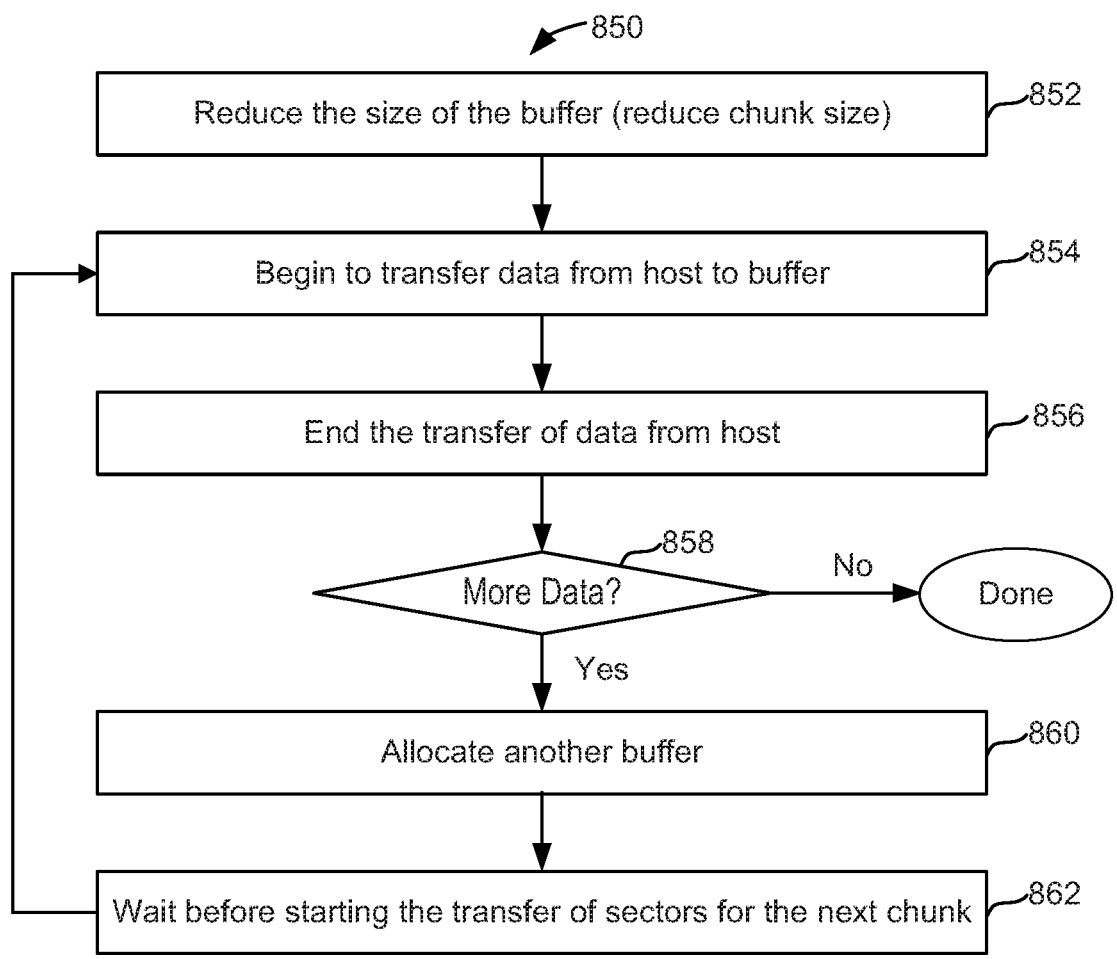
FIG. 8B is a flowchart of one embodiment of a process of throttling an SD host.

FIG. 8B is a flowchart of one embodiment of a process 850 of throttling an SD host 30. Process 850 is one embodiment of step 806 from process 800. The process 850 may be performed by SD-NVMe manager 40. The process 850 may be performed by memory system 100 of FIG. 1B, 1C, 2A, 2B, or 2C, but is not limited thereto.

Step 852 is to reduce the size of regions 604 allocated in the data buffer 44 for an NVMe command. This may also be stated as reducing the size of chunks 606 of data to be stored in the allocated region. For example, the buffer size might be reduced from 32 kB to 16 kB, 8 kB, 4 kB, or even one sector (e.g., 512 bytes).

Step 854 includes beginning to transfer sectors of data from the host 140 for this chunk 606. Step 856 includes ending the transfer of sectors of data for this chunk 606. Note that an NVMe command may be formed for this chunk 606 of data, the NVMe command sent to the NVMe submission queue 50, etc. Thus, the process of programming this chunk 606 may be initiated.

Step 858 is a determination of whether there is more data for this SD command. If not, then the process concludes.

If there is more data (step 858=yes), then another data buffer is allocated, in step 860.

Step 862 includes waiting before initiating the transfer of the sectors for the next chunk 606. After waiting for some time, transfer of data for the next chunk 606 is begun at step 854. Note that waiting in step 862 may allow a significant gap in time between buffer allocations in step 860. For example, there could be up to 250 ms between buffer allocations with SD write timing constraints still being met.

Process 850 may, in effect, reduce a rate at which data is accepted from the host 140. For example, the wait at step 862 could be up to the maximum permitted by the protocol. Each loop between steps 854 and 862 transfers one chunk 606 of data from the host. The following examples are used to illustrate. An assumption is made that the loop takes about 250 ms. If the chunk 606 size is 32 kB, then acceptance rate of data from the host is 32 kB per 250 ms. If the chunk 606 size is 16 kB, then acceptance rate of data from the host is 16 kB per 250 ms. If the chunk 606 size is 8 kB, then acceptance rate of data from the host is 8 kB per 250 ms. If the chunk 606 size is 4 kB, then acceptance rate of data from the host is 4 kB per 250 ms. If the chunk 606 size is 512 bytes, then acceptance rate of data from the host is 512 bytes 250 ms. Thus, the amount of throttling can be adjusted based on the chunk 606 size.

Figure 9:
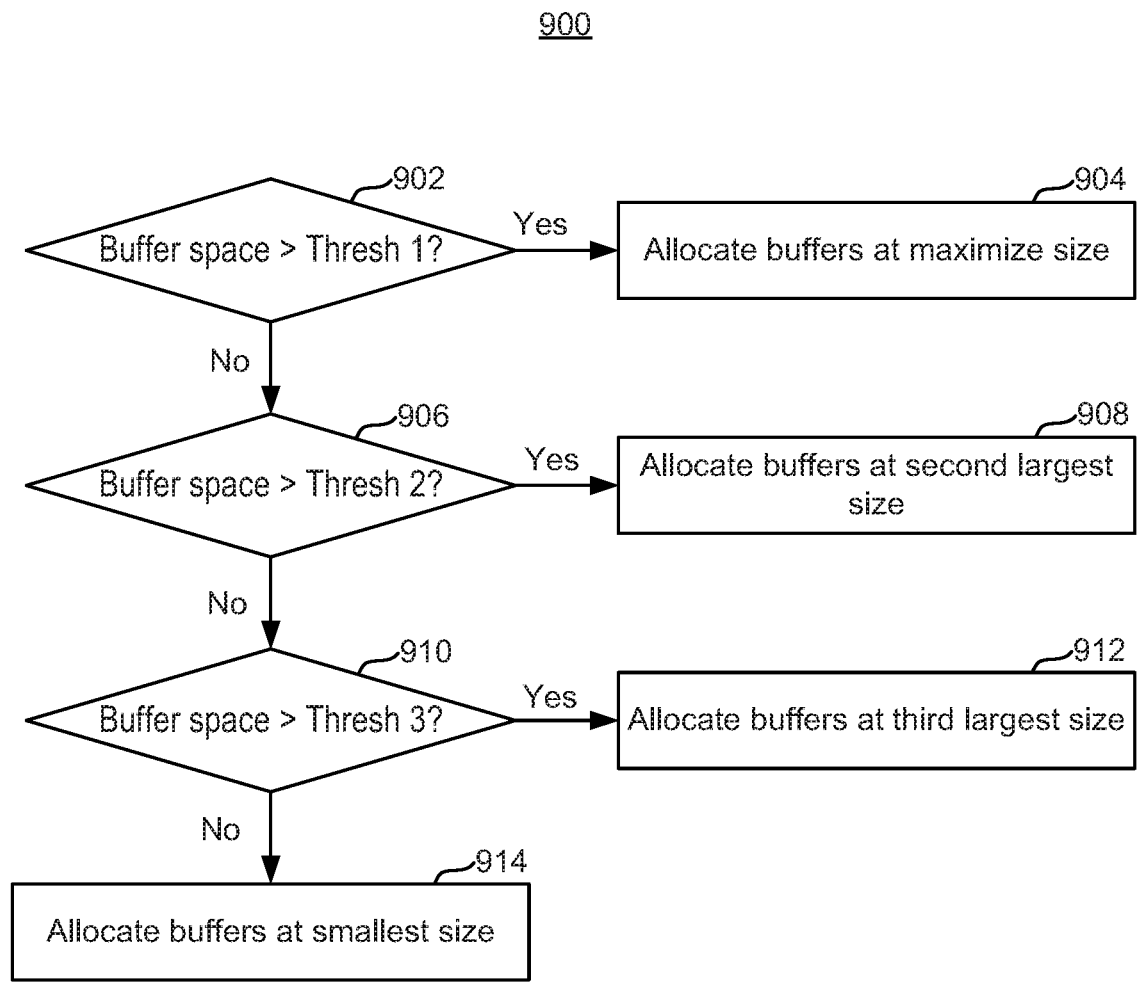
FIG. 9 is a flowchart of one embodiment of a process of allocating different size regions in the data buffer, which may be used to achieve different levels of SD host throttling.

In one embodiment, the SD-NVMe manager 40 uses several different levels of throttling. These levels may be based on the amount of data buffer space that is available. FIG. 9 is a flowchart of one embodiment of a process 900 of allocating different size regions 604 in the data buffer 44, which may be used to achieve different levels of SD host throttling. Process 900 is one embodiment of step 852 in process 850. The process 900 may be performed by SD-NVMe manager 40. The process 900 may be performed by memory system 100 of FIG. 1B, 1C, 2A, 2B, or 2C, but is not limited thereto.

Step 902 includes a determination of whether available space in the data buffer 44 is greater than a first threshold (Thresh 1). For example, step 902 is a determination of whether at least 25 percent of the total data buffer space is available. If the available space in the data buffer 44 is greater than the first threshold, then the regions 604 are allocated at a maximum size, in step 904. For example, the regions are each 32 kB. In step 904, no host throttling is performed.

If the available space is not greater than the first threshold (step 902 is no), then step 906 is performed. Step 906 includes a determination of whether available space in the data buffer 44 is greater than a second threshold (Thresh 2). For example, step 906 is a determination of whether at least 15 percent of the total data buffer space is available. If the available space in the data buffer 44 is greater than the second threshold (but not greater than the first threshold), then the regions 604 are allocated at a second largest size, in step 908. For example, the regions are each 16 kB. As another example, the regions are each 8 kB. Step 908 achieves a first amount of host throttling.

If the available space is not greater than the second threshold (step 906 is no), then step 910 is performed. Step 910 includes a determination of whether available space in the data buffer 44 is greater than a third threshold (Thresh 3). For example, step 910 is a determination of whether at least 5 percent of the total data buffer space is available. If the available space in the data buffer 44 is greater than the third threshold (but not greater than the second threshold), then the regions 604 are allocated at a third largest size, in step 912. For example, the regions are each 4 kB. Step 912 achieves a second amount of host throttling, which is greater than the first amount of host throttling.

If the available space is not greater than the third threshold (step 910 is no), then step 914 is performed. In step 914, the regions 604 are allocated at a smallest size. For example, the regions are each 512 bytes. Step 914 achieves the most amount of host throttling.

As noted above, process 900 is one embodiment of step 852 of process 850. Returning again to process 850, the loop between steps 854-862 may be performed for one or more chunks 606. The allocation of buffer size in step 852 may have the effect of reducing the chunk size. This may have the effect of reducing the rate at which data is accepted from the host. Thus, process 900 provides for progressively more throttling of the SD host 30.

In one embodiment, the NVMe controller 70 may help to trigger SD host throttling. For example, if the NVMe controller 70 spends more time on background operations such as garbage collection, this may reduce the rate at which the NVMe controller 70 transfers data out of the data buffer 44. Therefore, if more data continues to be transferred into the data buffer 44, buffer space may become low. Thus, throttling by the SD-NVMe manager 40 may be triggered in response to low buffer space.

Figure 10:
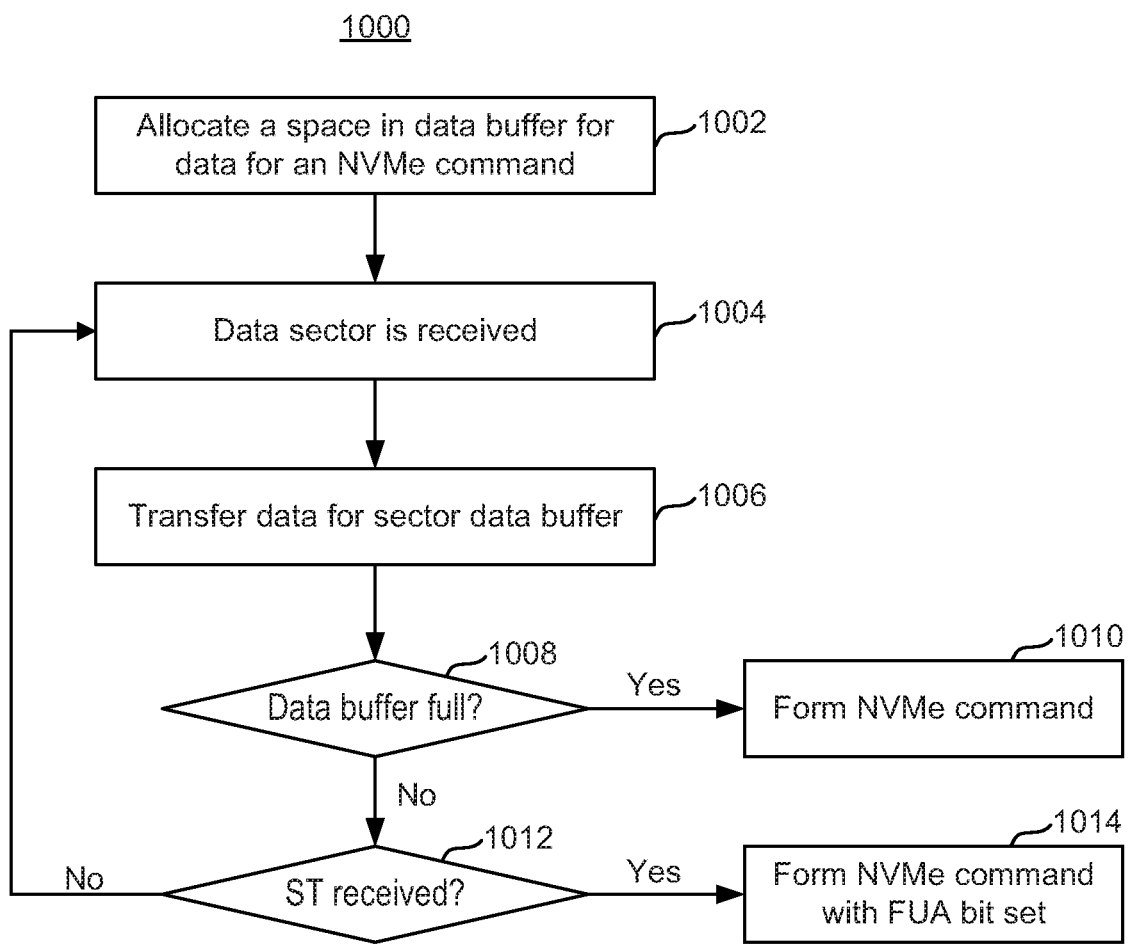
FIG. 10 is a flowchart of one embodiment of a process of handling a stop transmission command from an SD host.

In some cases, a write command is open-ended, which means that the SD host 30 may end transmission of data at any time. The SD host 30 may send a stop transmission command to the memory system 100, to indicate that there is no more data for the SD command. FIG. 10 is a flowchart of one embodiment of a process 1000 of handling a stop transmission command from an SD host 30. The process 1000 may be performed by SD-NVMe manager 40. The process 1000 may be performed by memory system 100 of FIG. 1B, 1C, 2A, 2B, or 2C, but is not limited thereto.

Step 1002 includes allocating a region 604 in data buffer 44 for an NVMe command. This might be performed during the normal mode, or when throttling the SD host 30. Thus, the region 604 could be the maximum size or a reduced size.

Step 1004 includes receiving a data sector from the SD host 30. The data sector is received by memory system 100 over interface 120. Step 1006 includes transferring data for the sector to the region in the data buffer 44.

Step 1008 is a determination of whether the region 604 in the data buffer 44 is full. If it is, then an NVMe command may be formed in step 1010. Step 1010 is one embodiment of step 702 of process 700. After forming the NVMe command, processing may continue as in steps 704 onward in process 700.

If the region 604 in the data buffer 44 is not full, then step 1012 is performed. Step 1012 represents a determination of whether a stop transmission (ST) command is received from the host 140. In response to receiving the ST command, the SD-NVMe manager 40 forms an NVMe command with the FUA bit set, in step 1014. Step 1014 is one embodiment of steps 702-706 of process 700. Note that in this example, the region 604 in the data buffer 44 was not full when the ST command was received. Thus, the chunk 606 for this NVMe command may be smaller than the chunks for other NVMe commands for this SD command.

A first embodiment disclosed herein includes an apparatus comprising: non-volatile storage; a communication interface configured to receive commands to access the non-volatile storage; and a Secure Digital (SD) to Non-Volatile Memory Express (NVMe) manager. The SD to NVMe manager is configured to receive an SD command from a host over the communication interface. The SD command is a command to access the non-volatile storage. The SD to NVMe manager is configured to allocate a separate region in a data buffer in the apparatus for data for the SD command for each of one or more NVMe commands; submit the one or more NVMe commands to an NVMe submission queue in the apparatus; access a command status from an NVMe completion queue in the apparatus for each of the one or more NVMe commands; and provide a response over the communication interface to the host that the SD command has completed in response to completion of all of the one or more NVMe commands.

In a second embodiment, and in furtherance of the first embodiment, the SD to NVMe manager is further configured to reduce a rate at which data for the SD command is transferred over the communication interface in response to space in the data buffer being below a threshold.

In a third embodiment, and in furtherance of the first or second embodiments, the SD to NVMe manager is further configured to allocate a smaller region in the data buffer for each of the one or more NVMe commands in response to the space in the data buffer being below a threshold.

In a fourth embodiment, and in furtherance of any of the first to third embodiments, the SD to NVMe manager is further configured to: form chunks of data from data received over the communication interface for the SD command; allocate a separate region in the data buffer for each of the chunks; and submit a separate NVMe command to the NVMe submission queue for each of the chunks.

In a fifth embodiment, and in furtherance of any of the first to fourth embodiments, the SD to NVMe manager is further configured to add information to the last of the one or more NVMe commands that the NVMe command is to be completed within a certain time limit.

In a sixth embodiment, and in furtherance of any of the first to fifth embodiments, the SD to NVMe manager is further configured to form a chunk of data from all sectors of data received over the communication interface for the SD command in response to the total amount of data for the SD command being within a threshold size.

In a seventh embodiment, and in furtherance of any of the first to sixth embodiments, the communication interface includes a Secure Digital (SD) bus.

In an eighth embodiment, and in furtherance of any of the first to seventh embodiments, the apparatus further comprises a Peripheral Computer Interconnect Express (PCIe) bus. The SD to NVMe manager is further configured to submit the one or more NVMe commands for the SD command to the NVMe submission queue over the PCIe bus.

In a ninth embodiment, and in furtherance of any of the first to sixth embodiments, the communication interface includes a Peripheral Computer Interconnect Express (PCIe) bus.

In a tenth embodiment, and in furtherance of any of the first to ninth embodiments, the SD to NVMe manager is further configured to submit an NVMe command based on whatever data is in the data buffer for the NVMe command in response to receiving a stop transmission command from the host over the communication interface.

One embodiment disclosed herein includes a method of operating a memory system. The method includes receiving a Secure Digital (SD) command at the memory system from a host over a communication interface. The SD command is a command to access non-volatile memory in the memory system. The method also includes allocating a separate region in a data buffer in the memory system for data for the SD command for each of one or more Non-Volatile Memory Express (NVMe) commands; submitting the one or more NVMe commands to an NVMe submission queue in the memory system; performing one or more memory accesses of the non-volatile memory to satisfy the one or more NVMe commands; accessing a command status from an NVMe completion queue in the memory system for each of the one or more NVMe commands; and providing a response to the host over the communication interface that the SD command has completed in response to completion of all of the one or more NVMe commands.

One embodiment disclosed herein includes a non-volatile memory system comprising: non-volatile storage; communication interface means for receiving commands from a host to access the non-volatile storage; and Secure Digital (SD) to Non-Volatile Memory Express (NVMe) manager means. The SD to NVMe means is for receiving an SD command from a host over the communication interface means. The SD command is a command to access the non-volatile storage. The SD to NVMe means is further for allocating a separate region in a data buffer for data for the SD command for each of one or more NVMe commands; and submitting the one or more NVMe commands to an NVMe submission queue in the memory system. The non-volatile memory system further comprises memory access means for performing a memory access of the non-volatile memory to satisfy the one or more NVMe commands. The SD to NVMe manager means is further for: accessing a command completion from an NVMe completion queue in the memory system for each of the one or more NVMe commands; and providing a response to the host over the communication interface means that the SD command has completed in response to the completion of all of the one or more NVMe commands.

One embodiment of the communication interface means comprises one or more of interface 120, SD interface 120*a*, PCIe interface 120*b*, front end module 208, host interface 220, PHY 222, software stored in a processor readable device (e.g., memory) to program a processor to perform the communication interface means, an application specific integrated circuit (ASIC), a Field Programmable Gate Array (FPGA), a circuit, a digital logic circuit, an analog circuit, a combination of discrete circuits, gates. The communication interface means is not limited to these examples.

One embodiment of the Secure Digital (SD) to Non-Volatile Memory Express (NVMe) manager means comprises one or more of SD-NVMe manager 40, processor 122*c*, buffer management/bus controller 214, software stored in a processor readable device (e.g., memory) to program a processor to perform the SD to NVMe means, an application specific integrated circuit (ASIC), a Field Programmable Gate Array (FPGA), a circuit, a digital logic circuit, an analog circuit, a combination of discrete circuits, gates. The Secure Digital (SD) to Non-Volatile Memory Express (NVMe) manager means is not limited to these examples.

One embodiment of the memory access means comprises one or more of NVMe controller 70, processor 122*c*, control circuitry 110, state machine 112, on-chip adders decoders 114, power control 116, decoders 124/132, read/write circuits 128, second blocks (SB1, . . . ), software stored in a processor readable device (e.g., memory) to program a processor to perform the memory access means, an application specific integrated circuit (ASIC), a Field Programmable Gate Array (FPGA), a circuit, a digital logic circuit, an analog circuit, a combination of discrete circuits, gates. The memory access means is not limited to these examples.

Corresponding methods, systems and computer- or processor-readable storage devices which have executable code for performing the methods provided herein may also be provided.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. An apparatus comprising:
   non-volatile storage;
   a communication interface configured to receive commands to access the non-volatile storage; and one or more control circuits configured to:
receive a first type of memory access command from a host over the communication interface, the first type of memory access command being a command to read or write multiple sectors from or to non-volatile memory in which a timing constraint is enforced on a per sector basis;
allocate a separate region in a data buffer in the apparatus for data for the first type of memory access command for each of one or more commands of a second type of memory access command for which a timing constraint is enforced on a per command basis;
submit the one or more commands of the second type of memory access command to a submission queue in the apparatus;
access a command status from a completion queue in the apparatus for each of the one or more commands of the second type of memory access command; and
provide a response over the communication interface to the host that the first type of memory access command has completed in response to completion of all of the one or more commands of the second type of memory access command.

2. The apparatus of claim 1, wherein the one or more control circuits are further configured to:
reduce a rate at which data for commands of the first type of memory access command are transferred over the communication interface in response to space in the data buffer being below a threshold in order to meet a timing constraint of the first type of memory access command.

3. The apparatus of claim 2, wherein the one or more control circuits are further configured to:
allocate a smaller region in the data buffer for each of the one or more commands of the second type of memory access command in response to the space in the data buffer being below a threshold in order to meet the timing constraint of the first type of memory access command.

4. The apparatus of claim 1, wherein the one or more control circuits are further configured to:
add information to a last of the one or more commands of the second type of memory access command that the last command of the second type of memory access command is to be completed within a certain time limit.

5. The apparatus of claim 1, wherein the one or more control circuits are further configured to:
submit a command of the second type of memory access command to the submission queue based on whatever data is in the data buffer for a last command of the second type of memory access command in response to receiving a stop transmission command from the host over the communication interface, the stop transmission command indicates that there is no more data for the first type of memory access command.

6. The apparatus of claim 1, wherein the one or more control circuits are further configured to enforce the timing constraint for the first type of memory access command.

7. The apparatus of claim 1, wherein the submission queue is compliant with a specification that allows a host to submit the second type of memory access command to the submission queue for the apparatus to execute.

8. The apparatus of claim 7, wherein the completion queue is compliant with the specification.

9. A method of operating a memory system, the method comprising:
receiving a first type of memory access command at the memory system from a host over a communication interface, the first type of memory access command being a command to read or write multiple sectors from or to non-volatile memory in the memory system in which a timing constraint is enforced on a per sector basis;
allocating a separate region in a data buffer in the memory system for data for the first type of memory access command for each of one or more commands of a second type of memory access command for which a timing constraint is enforced on a per command basis;
submitting the one or more commands of the second type of memory access command to a submission queue in the memory system, the submission queue being compliant with a specification that allows a host to submit the second type of memory access command to the submission queue for the memory system to execute;
performing one or more memory accesses of the non-volatile memory to satisfy the one or more commands of the second type of memory access command;
accessing a command status from a completion queue in the memory system for each of the one or more commands of the second type of memory access command, the completion queue being compliant with the specification; and
providing a response to the host over the communication interface that the first type of memory access command has completed in response to completion of all of the one or more commands of the second type of memory access command, including enforcing the timing constraint for the first type of memory access command.

10. The method of claim 9, wherein enforcing the timing constraint for the first type of memory access command comprises:
reducing a rate at which data from the host is accepted over the communication interface in response to space in the data buffer being below a threshold.

11. The method of claim 10, wherein:
allocating a separate region in the data buffer for data for the first type of memory access command for each of one or more commands of the second type of memory access command comprises: allocating a separate region in the data buffer for chunks that each comprise multiple sectors of data for the first type of memory access command, wherein the memory system is allowed a certain amount of time to program each sector; and
reducing a rate at which data from the host is accepted over the communication interface in response to space in the data buffer being below a threshold comprises: reducing a rate at which sectors are accepted from the host over the communication interface.

12. The method of claim 10, wherein reducing a rate at which data from the host is accepted over the communication interface in response to space in the data buffer being below a threshold comprises:
allocating a smaller region in the data buffer for each of the one or more commands of the second type of memory access command in response to the space in the data buffer being below a threshold.

13. The method of claim 9, wherein:
allocating a separate region in the data buffer for data for the first type of memory access command for each of one or more commands of the second type of memory access command comprises: allocating a separate region in the data buffer for respective chunks of data formed from data received over the communication interface for the first type of memory access command; and submitting the one or more commands of the second type of memory access command to the submission queue in the memory system comprises: submitting a separate command of the second type of memory access command to the submission queue for each respective chunk.

14. A non-volatile memory system comprising:
non-volatile storage;
communication interface means for receiving commands from a host to access the non-volatile storage;
manager means for:
  receiving a first type of memory access command from a host over the communication interface means, the first type of memory access being a command to read or write multiple blocks from or to the non-volatile storage in which a timing constraint is enforced on a per block basis;
  allocating a separate region in a data buffer for data for the first type of memory access command for each of one or more second type of memory access commands for which a timing constraint is enforced on a per command basis;
  submitting the one or more second type of memory access commands to a submission queue in the memory system;
memory access means for performing a memory access of the non-volatile storage to satisfy the one or more second type of memory access commands;
wherein the manager means is further for:
  accessing a command completion from a completion queue in the memory system for each of the one or more second type of memory access commands; and
  providing a response to the host over the communication interface means that the first type of memory command has completed in response to completion of all of the one or more second type of memory access commands.

15. The non-volatile memory system of claim 14, wherein the manager means is further for:
  throttling data transfer for the first type of memory access commands in response to space in the data buffer being below a threshold.

16. The non-volatile memory system of claim 15, wherein the manager means is further for:
  allocating a smaller region in the data buffer for each of the one or more second type of memory access commands in order to throttle data transfer for the first type of memory access commands.

17. The non-volatile memory system of claim 14, wherein the manager means is further for:
  allocating a separate region in the data buffer for respective chunks of data formed from data received over the communication interface means for the first type of memory access command; and
  submitting a separate command of the second type to the submission queue for each respective chunk.

18. The non-volatile memory system of claim 14, wherein the manager means is further for enforcing the timing constraint for the first type of memory access command.

19. The non-volatile memory system of claim 14, wherein the submission queue is compliant with a specification that allows a host to submit the second type of memory access command to the submission queue for the non-volatile memory system to execute.

20. The non-volatile memory system of claim 19, wherein the completion queue is compliant with the specification.

* * * * *